(12) United States Patent
Yoshimi et al.

(10) Patent No.: US 10,386,207 B2
(45) Date of Patent: Aug. 20, 2019

(54) FREQUENCY DETECTOR FOR RECIPROCATING MOVING BODY, AND SWINGING JOINT DEVICE

(71) Applicant: JTEKT CORPORATION, Osaka-shi (JP)

(72) Inventors: Yoshitaka Yoshimi, Okazaki (JP); Hiromichi Ohta, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 53 days.

(21) Appl. No.: 15/431,151

(22) Filed: Feb. 13, 2017

(65) Prior Publication Data
US 2017/0234705 A1 Aug. 17, 2017

(30) Foreign Application Priority Data
Feb. 15, 2016 (JP) ................. 2016-025822

(51) Int. Cl.
*A61H 3/00* (2006.01)
*G01D 5/04* (2006.01)
*G01D 5/248* (2006.01)

(52) U.S. Cl.
CPC ............... *G01D 5/248* (2013.01); *A61H 3/00* (2013.01); *A61H 3/008* (2013.01); *G01D 5/04* (2013.01)

(58) Field of Classification Search
CPC .... A61H 3/00; A61H 3/008; A61H 2003/007; A61H 2201/164; A61H 2201/1642; A61H 2201/165; A61H 2201/1652; A61H 2205/10; A61H 2205/108; B25J 17/00; G01D 5/248; G01D 5/04
USPC .......................................... 601/34, 35; 702/33
See application file for complete search history.

(56) References Cited

U.S. PATENT DOCUMENTS

| 2016/0184165 A1* | 6/2016 | Ohta .................. A61H 3/00 623/27 |
| 2017/0043476 A1* | 2/2017 | Seo .................. B25J 9/0006 |

FOREIGN PATENT DOCUMENTS

| JP | 2012-66375 | 4/2012 |
| JP | 2013-236741 | 11/2013 |

* cited by examiner

*Primary Examiner* — Leslie J Evanisko
(74) *Attorney, Agent, or Firm* — Oblon, McClelland, Maier & Neustadt, L.L.P.

(57) ABSTRACT

A frequency detector includes an oscillation related information output portion to which moving body position related information and a correction parameter are input, and which outputs a frequency adjustment parameter and estimated moving body position related information; a frequency estimating portion to which the frequency adjustment parameter is input, and which outputs an estimated frequency; and an adjusting portion to which the moving body position related information, the estimated moving body position related information, and the estimated frequency are input, and which outputs the correction parameter.

6 Claims, 16 Drawing Sheets

FREQUENCY DETECTOR FOR RECIPROCATING MOVING BODY, AND SWINGING JOINT DEVICE

INCORPORATION BY REFERENCE

The disclosure of Japanese Patent Application No. 2016-025822 filed on Feb. 15, 2016 including the specification, drawings and abstract is incorporated herein by reference in its entirety.

BACKGROUND

1. Technical Field

The disclosure relates to a frequency detector for a reciprocating moving body, which detects a frequency of a motion waveform based on a motion trajectory of the reciprocating moving body that performs periodic reciprocating motion, and a swinging joint device that includes the frequency detector for the reciprocating moving body and varies rigidity of a joint.

2. Description of Related Art

For example, Japanese Patent Application Publication No. 2012-66375 (JP 2012-66375 A) discloses a robotic suit that appropriately assists walking of a user while a lower limb (from hip joint to toe) of the user is regarded as a moving body performing periodic reciprocating swinging motion. In the robotic suit, torque deviation between the robotic suit and the user is input such that the torque deviation is reduced by applying PID control (feedback control).

In addition, Japanese Patent Application Publication No. 2013-236741 (JP 2013-236741 A) discloses a one leg-type walking assist device which is attached to an affected leg of a user whose one leg is a healthy leg and the other leg is the affected leg, thereby assisting motion of the affected leg. The one leg-type walking assist device includes a waist attachment portion which is disposed on the side of the waist of the user, a femoral link portion which extends from the side of the hip joint to the side of a knee joint, a lower leg link portion which extends downward from the side of the knee joint, a torque generator which is disposed on the side of the hip joint, and a damper which is disposed on the side of the knee joint. The torque generator is configured using a cam and a compression spring, generates torque when the affected leg moves rearward due to the forward swinging of the healthy leg, and assists the forward swinging of the affected leg by using the generated torque. Thus, there is no need to provide an actuator such as an electric motor. In addition, the initial compression amount of the compression spring is adjustable. Therefore, the magnitude of generated torque is variable.

SUMMARY

In JP 2012-66375 A, it is necessary to enhance synchronism between reciprocating swinging motion resulting from walking of a user and reciprocating swinging motion resulting from assistance of a robotic suit. In this regard, it is considered that when a frequency of the reciprocating swinging motion resulting from walking of the user is estimated and the reciprocating swinging motion resulting from assistance of the robotic suit is performed at a frequency which coincides with the estimated frequency, the synchronism can be further enhanced. However, in the robotic suit disclosed in JP 2012-66375 A, the frequency of the reciprocating swinging motion resulting from walking of the user is not directly estimated.

In addition, recently, it has been desired to detect (estimate) a frequency of a reciprocating moving body, such as a frequency of reciprocating swinging motion of a lower limb necessary to assist walking or running of a user and a frequency of reciprocating motion necessary to assist motion of a movable portion of a machine tool which performs reciprocating motion including reciprocating linear motion and reciprocating swinging motion.

It is burdensome for a user in need of assistance in walking to carry a large and heavy battery. Therefore, in the robotic suit disclosed in JP 2012-66375 A, it is estimated that a relatively small and light battery is used. However, JP 2012-66375 A does not disclose any particular configuration in which power consumption of an electric actuator is reduced. Thus, it is estimated that the robotic suit disclosed in JP 2012-66375 A has a relatively short continuous operation time.

In addition, in the one leg-type walking assist device disclosed in JP 2013-236741 A, torque for swinging a leg forward is generated with the cam and the compression spring without using any electric motor, and thus, it is estimated that the continuous operation time is longer than that in JP 2012-66375 A. However, due to the difference in body size (difference in the moment of inertia of a lower limb) among users, the difference in a movement angle of a lower limb among users, the physical condition of each user, the difference in slope among walking locations, and the like, the user needs to manually adjust the initial compression amount of the compression spring by adjusting the position of a determination portion provided in the upper portion of the compression spring of a torque generator, with a tool such as a flat-blade screwdriver, which is troublesome.

The disclosure provides a frequency detector for a reciprocating moving body, which appropriately detects (estimates) a frequency of a reciprocating moving body (reciprocating moving body), and a swinging joint device which includes the frequency detector for the reciprocating moving body and which automatically adjusts the rigidity of a reciprocating joint to automatically adjust torque generated through reciprocating motion, thereby further reducing power consumption of an electric motor moving the reciprocating moving body or a load of the user during walking or running (energy for causing a lower limb, which is the reciprocating moving body, to reciprocate).

A first aspect of the disclosure relates to a frequency detector for a reciprocating moving body, the frequency detector being configured to detect a frequency of a motion waveform based on a motion trajectory of the reciprocating moving body that performs reciprocating motion including periodic reciprocating linear motion or periodic reciprocating swinging motion. The frequency detector includes an oscillation related information output portion to which moving body position related information is input, and which performs oscillation in synchronization with the reciprocating motion of the reciprocating moving body based on the input moving body position related information, and outputs oscillation related information that is information related to an oscillation waveform based on the oscillation, the moving body position related information being related to a position of the reciprocating moving body varied with a lapse of time; a frequency estimating portion that outputs an estimated frequency, as the frequency of the motion waveform, the estimated frequency being a frequency of the oscillation waveform estimated based on the oscillation related information; and an adjusting portion that determines a correction amount for the oscillation related information output portion so as to cause the frequency of the motion waveform and the estimated frequency to coincide with each other. The oscillation related information output portion outputs i) a frequency adjustment parameter that is one of pieces of the oscillation related information and is a parameter adjusted based on the correction amount from the adjusting portion, and ii) estimated moving body position related information that is one of the pieces of the oscillation related information and is estimated as the position of the reciprocating moving body based on the moving body position related information. The frequency estimating portion outputs the estimated frequency determined based on the frequency adjustment parameter that is output from the oscillation related information output portion. The adjusting portion determines a correction parameter that is the correction amount for correcting an operation of the oscillation related information output portion, based on the moving body position related information, the estimated moving body position related information, and the estimated frequency. The adjusting portion adjusts the estimated frequency output from the frequency estimating portion by outputting the determined correction parameter to the oscillation related information output portion to adjust the frequency adjustment parameter and the estimated moving body position related information that are output from the oscillation related information output portion.

According to the above aspect, the frequency detector for the reciprocating moving body, which includes the oscillation related information output portion, the frequency estimating portion, and the adjusting portion, is appropriately configured. Thus, it is possible to realize the frequency detector in which the estimated frequency output from the frequency estimating portion can be automatically adjusted.

In the above aspect, the moving body position related information may be input to the oscillation related information output portion and the adjusting portion after the moving body position related information passes through a first filter; and the correction parameter may be input to the oscillation related information output portion after the correction parameter passes through a second filter.

In the above configuration, a noise component included in the moving body position related information is reduced by passing the moving body position related information through the first filter, and a noise component included in the correction parameter is reduced by passing the correction parameter through the second filter. Thus, it is possible to more accurately adjust the estimated frequency.

In the above aspect, the reciprocating motion may be the periodic reciprocating swinging motion, and the moving body position related information may be a swinging angle related to the position of the reciprocating moving body varied with the lapse of time, or the reciprocating motion may be the periodic reciprocating linear motion, and the moving body position related information may be an angle based on the position of the reciprocating moving body varied with the lapse of time.

In the above configuration, in a case where the reciprocating motion is the reciprocating swinging motion, the swinging angle varied with the lapse of time is used as the moving body position related information. In a case where the reciprocating motion is the reciprocating linear motion, the angle based on the position of the reciprocating moving body varied with the lapse of time is used as the moving body position related information. Accordingly, it is possible to appropriately set the moving body position related information in accordance with the kind of the reciprocating motion.

In the above aspect, in a case where $x_1$ is membrane potential of a neuron and is a state variable for $f(x_1)$, $x_2$ is membrane potential of a neuron and is a state variable for $f(x_2)$, $f(x_1)$ and $f(x_2)$ are outputs of the neurons on condition that $f(x_j)=\max(0, x_j)$, $v_1$ is a variable indicating a degree of adaptation and is a state variable for $f(v_1)$, $v_2$ is a variable indicating a degree of adaptation and is a state variable for $f(v_2)$, $f(v_1)$ and $f(v_2)$ are variables respectively indicating degrees of adaptation on condition that $f(v_1)=\max(0, v_1)$, $\beta$ is a constant determining a change in adaptation over time and is adaptation strength, $\gamma$ is a constant determining a change in adaptation over time and is a coupling coefficient for two adaptive elements, $u_0$ is an external input that is a uniform constant, $T_1$ is the frequency adjustment parameter, $T_2$ is a parameter to be adjusted and is a time constant, $b$ is a parameter to be adjusted and is an input coefficient, $c$ is a parameter to be adjusted and is an output coefficient, $\theta_{fltr}$ is the moving body position related information, and $\theta_{neuro}$ is the estimated moving body position related information, the oscillation related information output portion may perform the oscillation based on the input moving body position related information and may output the frequency adjustment parameter and the estimated moving body position related information that are adjusted based on the correction parameter from the adjusting portion, by using a mathematical model including a neural oscillator having relationships of $$T_1\dot{x}_1+x_1=\gamma f(x_2)+b(u_0+\theta_{fltr})-\beta f(v_1)$$

$$T_2\dot{v}_1+v_1=f(x_1)$$

$$T_1\dot{x}_2+x_2=-\gamma f(x_1)+b(u_0-\theta_{fltr})-\beta f(v_2)$$

$$T_2\dot{v}_2+v_2=f(x_2)$$

$$\theta_{neuro}=cf(x_1)-cf(x_2);$$

in a case where $c_1$ and $c_2$ are constants of a frequency estimation calibration expression, $f_{calc}$ is the estimated frequency, and a ratio of $T_1/T_2$ is uniform, the frequency estimating portion may output the estimated frequency determined based on a relationship of $f_{calc}=(c_1/T_1)+c_2$, and the frequency adjustment parameter output from the oscillation related information output portion, and in a case where $K_{p1}$ and $K_{p2}$ are parameter adjustment gains that are constants, $\mathrm{sgn}(x)$ is a signum function that becomes 1 when $x>0$, becomes 0 when $x=0$, and becomes $-1$ when $x<0$, and $\Delta T_1$ is the correction parameter, the adjusting portion may determine the correction parameter based on a relationship of $$\Delta T_1=(K_{p1}/f_{calc})\{\mathrm{sgn}(\theta_{neuro})[(\dot{\theta}_{fltr})-(\dot{\theta}_{neuro})]\}-(K_{p2}/f_{calc})(|\theta_{fltr}|-|\theta_{neuro}|),$$

the moving body position related information, the estimated moving body position related information, and the estimated frequency, and the adjusting portion may adjust the estimated frequency output from the frequency estimating portion by outputting the determined correction parameter to the oscillation related information output portion to adjust the frequency adjustment parameter and the estimated moving body position related information that are output from the oscillation related information output portion.

In the above configuration, it is possible to more specifically and more appropriately realize the oscillation related information output portion, the frequency estimating portion, and the adjusting portion.

A second aspect of the disclosure relates to a swinging joint device that includes the frequency detector for the reciprocating moving body according to the first aspect, the swinging joint device being connected to the reciprocating moving body performing the reciprocating motion, and the swinging joint device alternately repeating an energy accumulation mode in which energy is accumulated in an elastic body through motion of the reciprocating moving body and an energy release mode in which the energy accumulated in the elastic body is released to assist the motion of the reciprocating moving body. The swinging joint device includes the frequency detector; a first output portion that is connected to the reciprocating moving body and swings around a swinging center; the elastic body that accumulates the energy and releases the energy in accordance with a first swinging angle that is a swinging angle of the first output portion and is the moving body position related information; an apparent rigidity varying portion that varies apparent rigidity of the elastic body seen from the first output portion; a first angle detecting portion that detects the first swinging angle; and a control portion that adjust the apparent rigidity of the elastic body seen from the first output portion by controlling the apparent rigidity varying portion in accordance with the first swinging angle detected by the first angle detecting portion. The control portion adjusts the apparent rigidity of the elastic body seen from the first output portion, based on the estimated frequency determined by the frequency detector, and the first swinging angle.

According to the above aspect, the apparent rigidity varying portion is controlled in accordance with the estimated frequency and the first swinging angle with the use of the control portion, and thus, the magnitude of torque required to assist the reciprocating motion is automatically adjusted with respect to the reciprocating motion of the reciprocating moving body including the first output portion. Therefore, it is possible to adjust the torque without trouble. In addition, accumulation of energy and releasing of energy are alternately performed with the use of the elastic body, and thus, it is possible to generate the torque required to assist the reciprocating motion. Accordingly, for example, in a case where the reciprocating moving body is caused to reciprocate by the electric motor or the like, it is possible to further reduce power consumption of the electric motor. In addition, for example, in a case where the reciprocating moving body is a lower limb of the user, it is possible to further reduce a load of the user during walking or running (energy for moving a lower limb).

In the above aspect, the elastic body may be a spiral spring; one end of the spiral spring may be connected to a first output portion-side input/output shaft portion that is turned around a spring central axis that is a central axis of the spiral spring, by an angle corresponding to the first swinging angle of the first output portion; another end of the spiral spring may be connected to a rigidity adjustment member that is turned around the spring central axis by a rigidity adjustment electric motor; the apparent rigidity of the elastic body may be an apparent spring constant of the spiral spring; and the apparent rigidity varying portion may be constituted by the rigidity adjustment electric motor and the rigidity adjustment member, and the apparent rigidity varying portion may adjust the apparent spring constant of the spiral spring seen from the first output portion by adjusting a turning angle of the rigidity adjustment member with use of the rigidity adjustment electric motor.

In the above configuration, in a case where the spiral spring is used as the elastic body, and for example, a lower limb of the user is the reciprocating moving body, the apparent spring constant (rigidity) seen from the first output portion is appropriately adjusted in accordance with the motion of the user, such as walking and running. Thus, it is possible to smoothly and appropriately accumulate energy in the spiral spring and release energy from the spiral spring by adjusting the apparent spring constant (rigidity) seen from the first output portion in accordance with the motion of the reciprocating moving body.

BRIEF DESCRIPTION OF THE DRAWINGS

Features, advantages, and technical and industrial significance of exemplary embodiment of the disclosure will be described below with reference to the accompanying drawings, in which like numerals denote like elements, and wherein.

DETAILED DESCRIPTION OF EMBODIMENT

Figure 1:
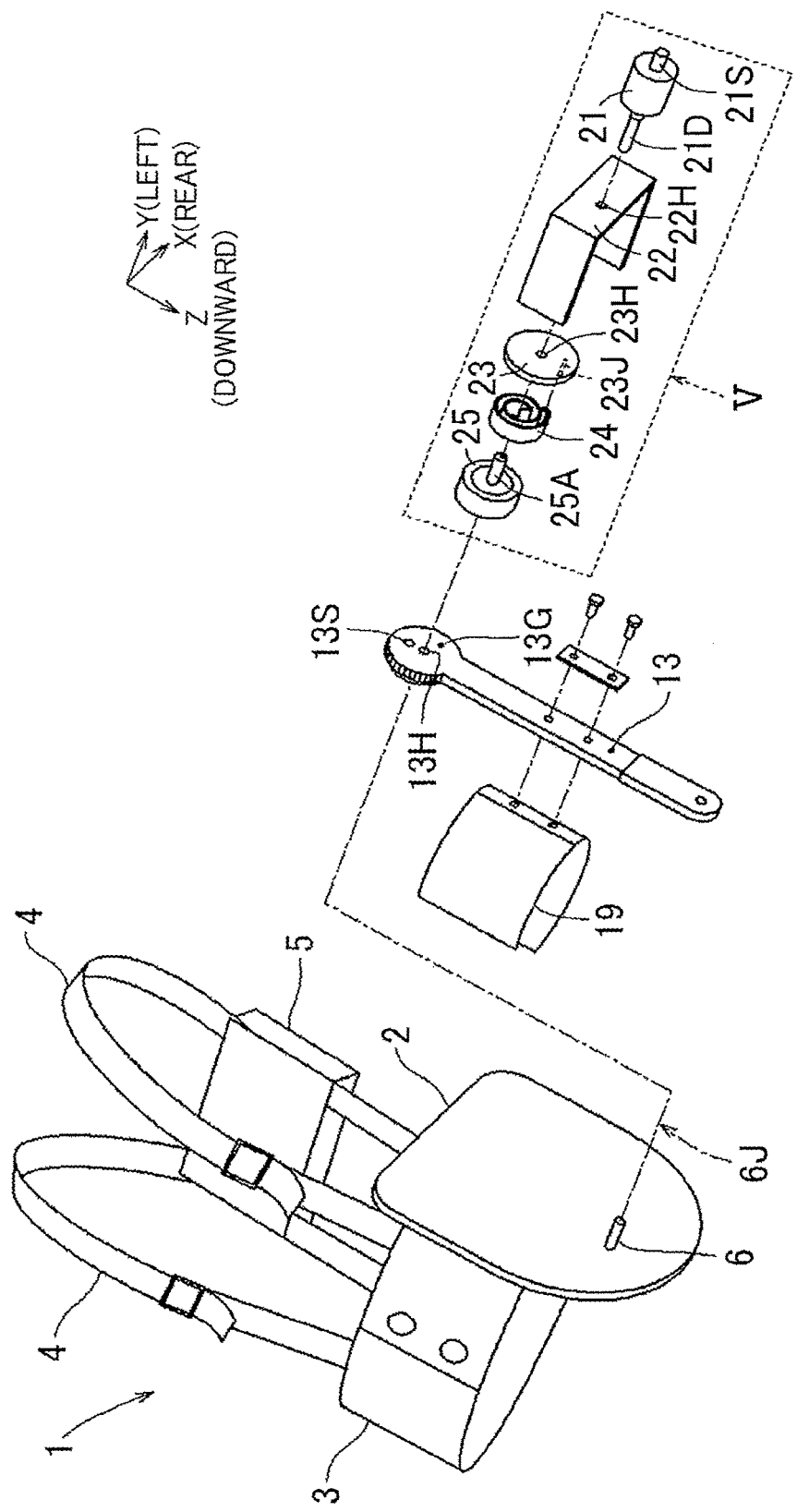
FIG. 1 is an exploded perspective view illustrating a schematic shape and a fitting position of each of constituent elements constituting a swinging joint device.

First, hereinafter, an overall structure of a swinging joint device 1 according to an embodiment of the disclosure will be described with reference to the drawings. In the drawings, in a case where an X-axis, a Y-axis, and a Z-axis are shown, the X-axis, the Y-axis, and the Z-axis are orthogonal to each other. Unless otherwise specified, a Z-axis direction indicates a vertically downward direction, an X-axis direction indicates a rearward direction with respect to a user (a user to whom a swinging joint device is attached), and a Y-axis direction indicates a direction toward the left with respect to the user. In this specification, "femoral swinging arm 13" illustrated in FIG. 1 may be regarded as "first output portion". In addition, in the description below, an example, in which a drive shaft member 6 is a protruding member, is described. However, the drive shaft member 6 may be a shaft having a protruding shape or may have a recessed shape (hole shape) supporting the shaft. Thus, the expression "around the drive shaft member 6" indicates "around a drive axis 6J which is a central axis of drive shaft member 6", or is the same as "around a swinging center". The term "drive axis 6J" may be regarded as "drive shaft". In addition, "shaft 25A" of a transmission 25 may be regarded as "first output portion-side input/output shaft portion". In addition, "electric motor 21" may be regarded as "rigidity adjustment electric motor". The term "rigidity adjustment member 23" and "electric motor 21" may be regarded as "apparent spring constant varying portion". In addition, "spiral spring 24" may be regarded as "elastic body". In addition, "rigidity" indicates torque per unit angle displacement required to swing the femoral swinging arm 13.

Figure 2:
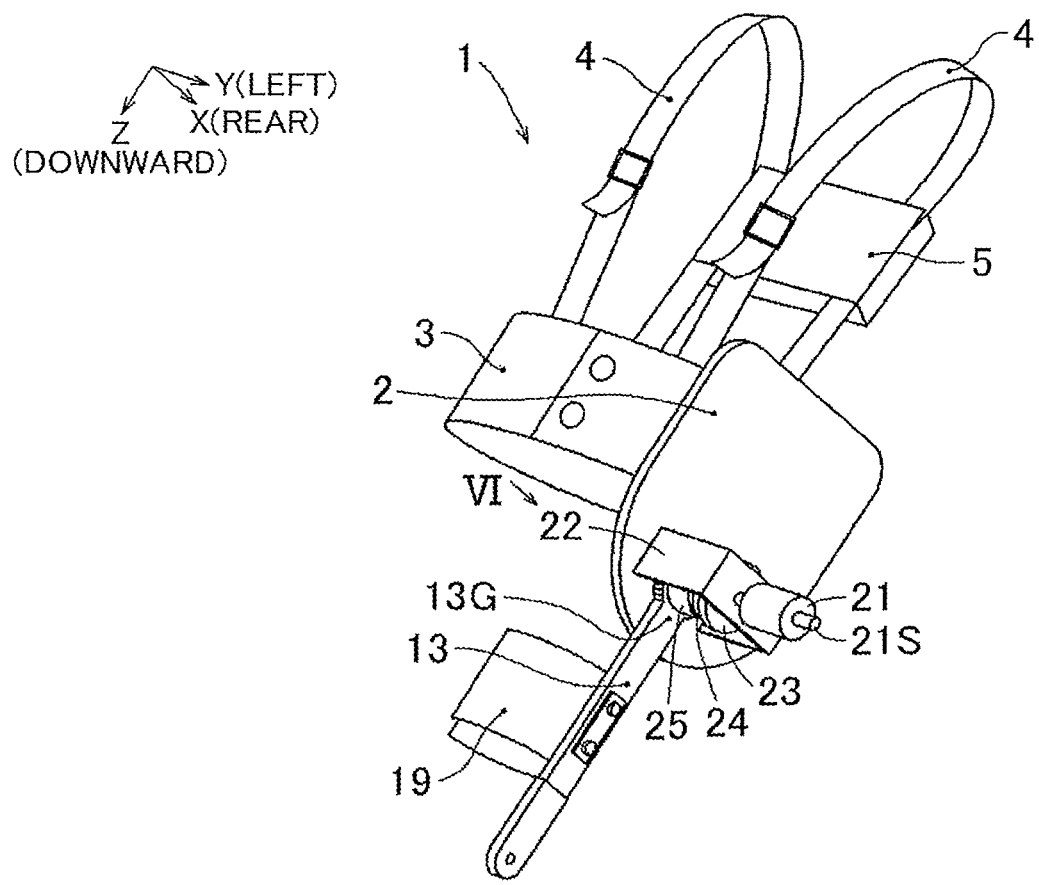
FIG. 2 is a perspective view of the swinging joint device configured by fitting the constituent elements illustrated in FIG. 1.

An overall configuration of the swinging joint device 1 will be described with reference to FIGS. 1 to 4. The swinging joint device 1 is attached to one leg of the user or both legs of the user. For example, the swinging joint device 1 assists motion of the user, such as walking or running. Hereinafter, description will be provided on an example in which the swinging joint device 1 is attached to the left leg of the user. As illustrated in FIG. 1, the swinging joint device 1 includes a user attachment portion indicated by the reference numerals 2, 3, 4, 5, 6, and the like, a femoral swinging portion indicated by the reference numerals 13, 19, and the like, and a rigidity adjusting portion indicated by the reference numerals 21, 22, 23, 24, 25, and the like. FIG. 1 is an exploded perspective view illustrating the shape, the fitting position, and the like of each of constituent elements in the swinging joint device 1. FIG. 2 illustrates the swinging joint device 1 in a state where the constituent elements are fitted.

Figure 3:
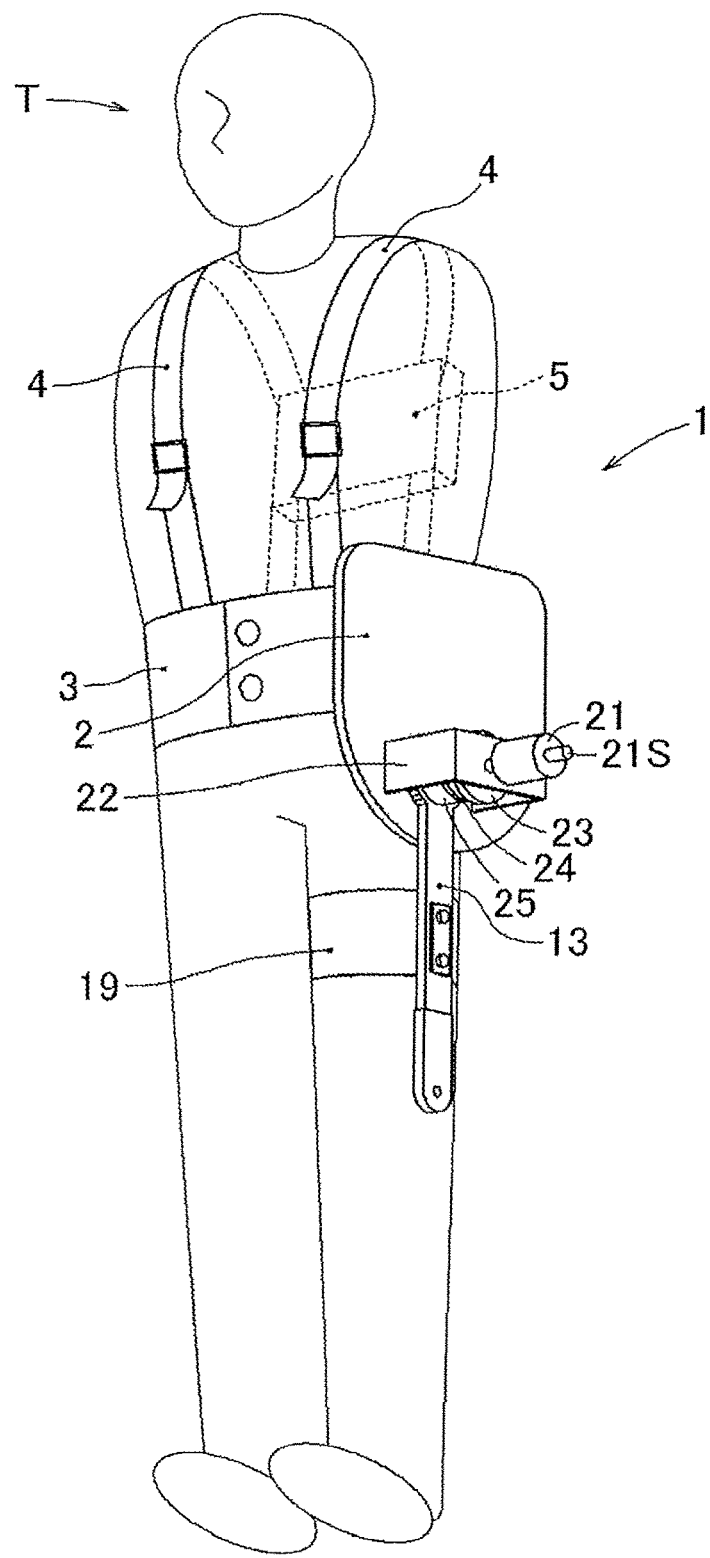
FIG. 3 is a view illustrating a state where the swinging joint device illustrated in FIG. 2 is attached to a user (illustration of an arm of the user is omitted)
Figure 4:
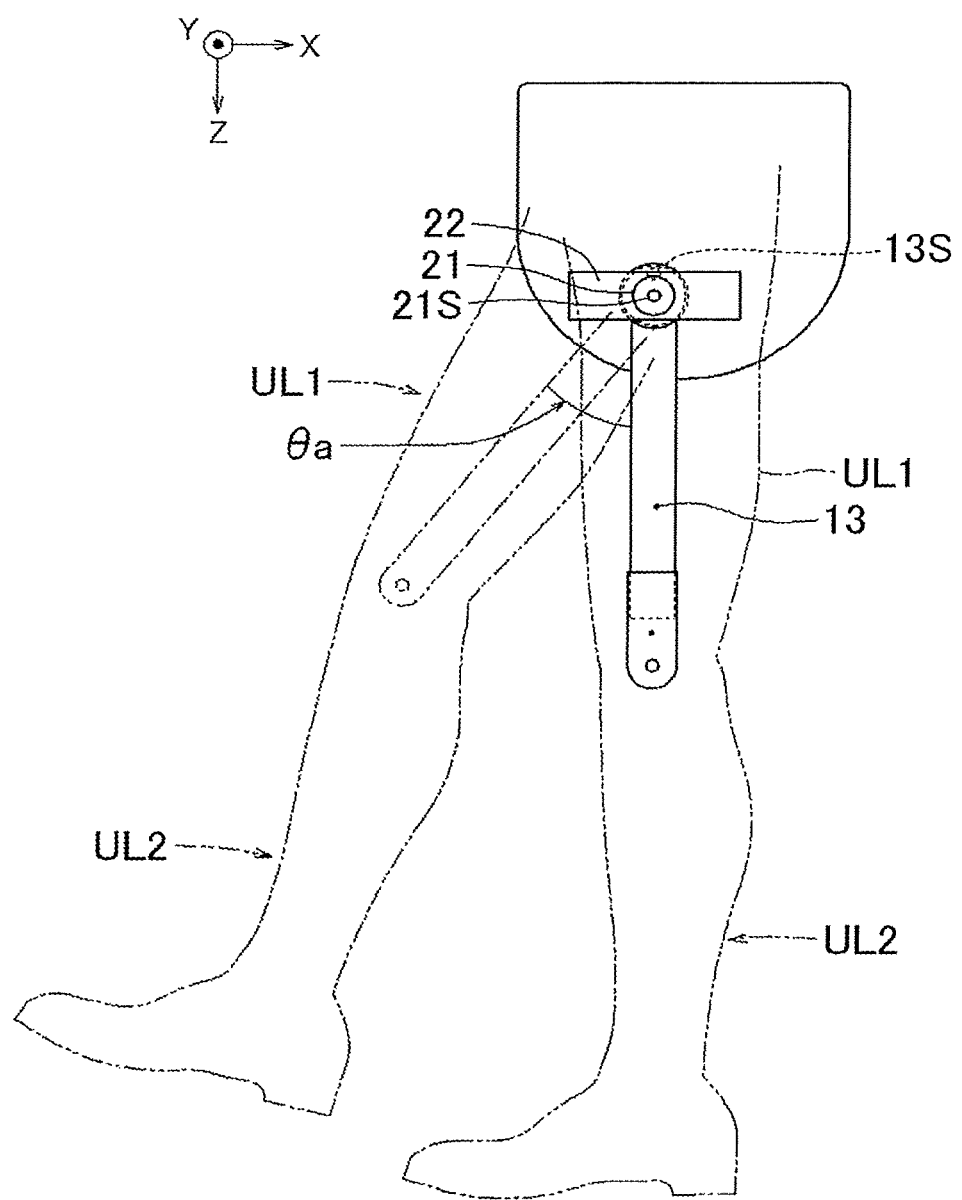
FIG. 4 is a view illustrating an example of swinging of a femoral swinging arm (first output portion)

In addition, FIG. 3 illustrates a state where the swinging joint device 1 is attached to the user, and FIG. 4 illustrates an example of swinging of the femoral swinging arm 13.

The user attachment portion will be described with reference to FIGS. 1 to 4. The user attachment portion includes a base portion 2, a waist attachment portion 3, shoulder belts 4, a control unit 5, the drive shaft member 6, and the like. The base portion 2 is a member which is fixed to the waist attachment portion 3 and serves as a base (base plate) that holds the femoral swinging portion and the rigidity adjusting portion. In addition, in the base portion 2, the drive shaft member 6 extending in substantially parallel to the Y-axis is attached at a position corresponding to the side of the hip joint of the user to whom the swinging joint device 1 is attached. The drive shaft member 6 is inserted through a through-hole 13H of the femoral swinging arm 13. The drive axis 6J indicates the central axis (swinging central axis) of the drive shaft member 6.

The waist attachment portion 3 is a member which is wound around the waist of the user and is fixed to the waist of the user. The waist attachment portion 3 is configured to be adjustable in accordance with the size around the waist of the user. In addition, the base portion 2 is fixed to the waist attachment portion 3 to which one end and the other end of each shoulder belt 4 is connected.

In each shoulder belt 4, one end is connected to the front surface side of the waist attachment portion 3, and the other end is connected to the back surface side of the waist attachment portion 3. The lengths of the shoulder belts 4 are adjustable, and the control unit 5 is attached to the shoulder belts 4. The user attaches the shoulder belts 4 to his/her shoulder by adjusting the lengths of the shoulder belts 4, and thus, the user can carry the control unit 5 on his/her back as a backpack.

Figure 12:
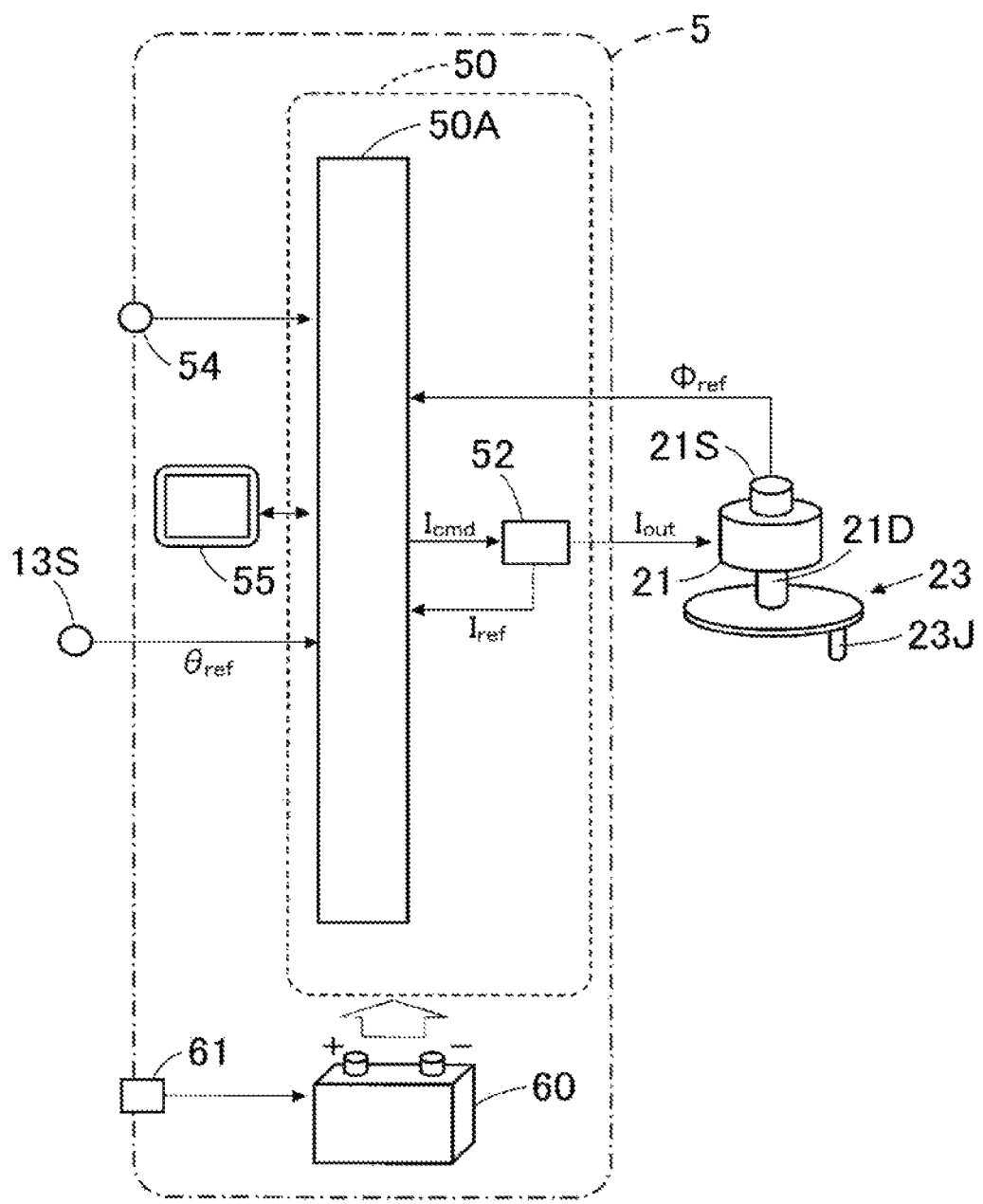
FIG. 12 is a view illustrating input-output of a control portion.

As illustrated in FIG. 12, the control unit 5 accommodates a control portion 50 configured to control the electric motor 21, a battery 60 configured to supply electric power to the control portion 50 and the electric motor 21, and the like. The control portion 50 will be described later with reference to FIG. 12.

The femoral swinging portion will be described with reference to FIGS. 1 to 4. The femoral swinging portion includes the femoral swinging arm 13, a femoral attachment portion 19, and the like. The femoral swinging arm 13 includes a disk portion 13G and an arm portion which extends downward from the disk portion 13G. The through-hole 13H is formed at the center of the disk portion 13G and the drive shaft member 6 is inserted through the through-hole 13H. Thus, the femoral swinging arm 13 is supported so as to be able to swing around the drive shaft member 6. In addition, the through-hole 13H of the femoral swinging arm 13 is disposed at the position corresponding to the side of the hip joint of the user.

In addition, the femoral attachment portion 19 is attached to the femoral swinging arm 13, and the femoral attachment portion 19 is applied to the femoral region (periphery of the thigh) of the user so as to facilitate attachment of the femoral swinging arm 13 to the femoral region of the user. In addition, the disk portion 13G is fixed to an input/output portion 25C of the transmission 25 (refer to FIG. 5), and the input/output portion 25C of the transmission 25 swings integrally with the femoral swinging arm 13. Thus, the input/output portion 25C of the transmission 25 swings around the drive axis 6J at the same angle as a swinging angle of the femoral swinging arm 13. In addition, femoral swinging arm 13 is provided with a first angle detecting portion 13S (for example, encoder) which can detect a first swinging angle that is the swinging angle of the femoral swinging arm 13 with respect to the base portion 2 (or the drive shaft member 6).

An operation of the swinging joint device 1 attached to the user will be described with reference to FIG. 4. With reference to FIG. 4, the operation of the femoral swinging arm 13 attached to a femoral region UL1 of the user will be described. The position of the femoral swinging arm 13 indicated by the solid line in FIG. 4 is an initial position of each arm (position when the user stands still in an upright state).

When the user swings the femoral region UL1 forward, the femoral swinging arm 13 swings forward from the initial position by an angle θa. In this case, as described below, a turning angle of a fixed end of the spiral spring 24 is adjusted by using the electric motor 21 such that swinging of the femoral region, which requires large torque, is appropriately reduced, thereby reducing a load of the user. In addition, while the turning angle of the fixed end of the spiral spring 24 is adjusted by using the electric motor 21, energy for swinging the femoral region UL1 forward is accumulated in the spiral spring 24. Moreover, while the turning angle of the fixed end of the spiral spring 24 is adjusted by using the electric motor 21, the energy accumulated in the spiral spring 24 is released so as to be utilized to swing the femoral region UL1 rearward. Similarly, energy generated when the femoral region UL1 swings rearward is accumulated in the spiral spring 24 and is utilized when the femoral region UL1 swings forward.

In this manner, the swinging joint device 1 alternately repeats an energy accumulation mode in which energy is accumulated through swinging motion of a moving body (in this case, the femoral swinging arm 13, and the femoral region UL1 of the user), and an energy release mode in which the accumulated energy is released so as to assist swinging motion of the moving body. Subsequently, the rigidity adjusting portion including the spiral spring 24 will be described.

The rigidity adjusting portion including the electric motor 21, a bracket 22, the rigidity adjustment member 23, the spiral spring 24, the transmission 25, and the like will be described with reference to FIGS. 1 to 3, and 5 to 7. The bracket 22 is a member that fixes the electric motor 21 to the base portion 2. The bracket 22 is provided with a through-hole 22H through which a rotary shaft of the electric motor 21 is inserted, and the bracket 22 is fixed to the base portion 2. In addition, as illustrated in FIGS. 1 and 6, the through-hole 13H of the disk portion 13G of the femoral swinging arm 13, the shaft 25A of the transmission 25, the central axis of the spiral spring 24, a through-hole 23H of the rigidity adjustment member 23, the through-hole 22H of the bracket 22, and an output shaft 21D of the electric motor 21 are disposed coaxially with the drive axis 6J.

Figure 5:
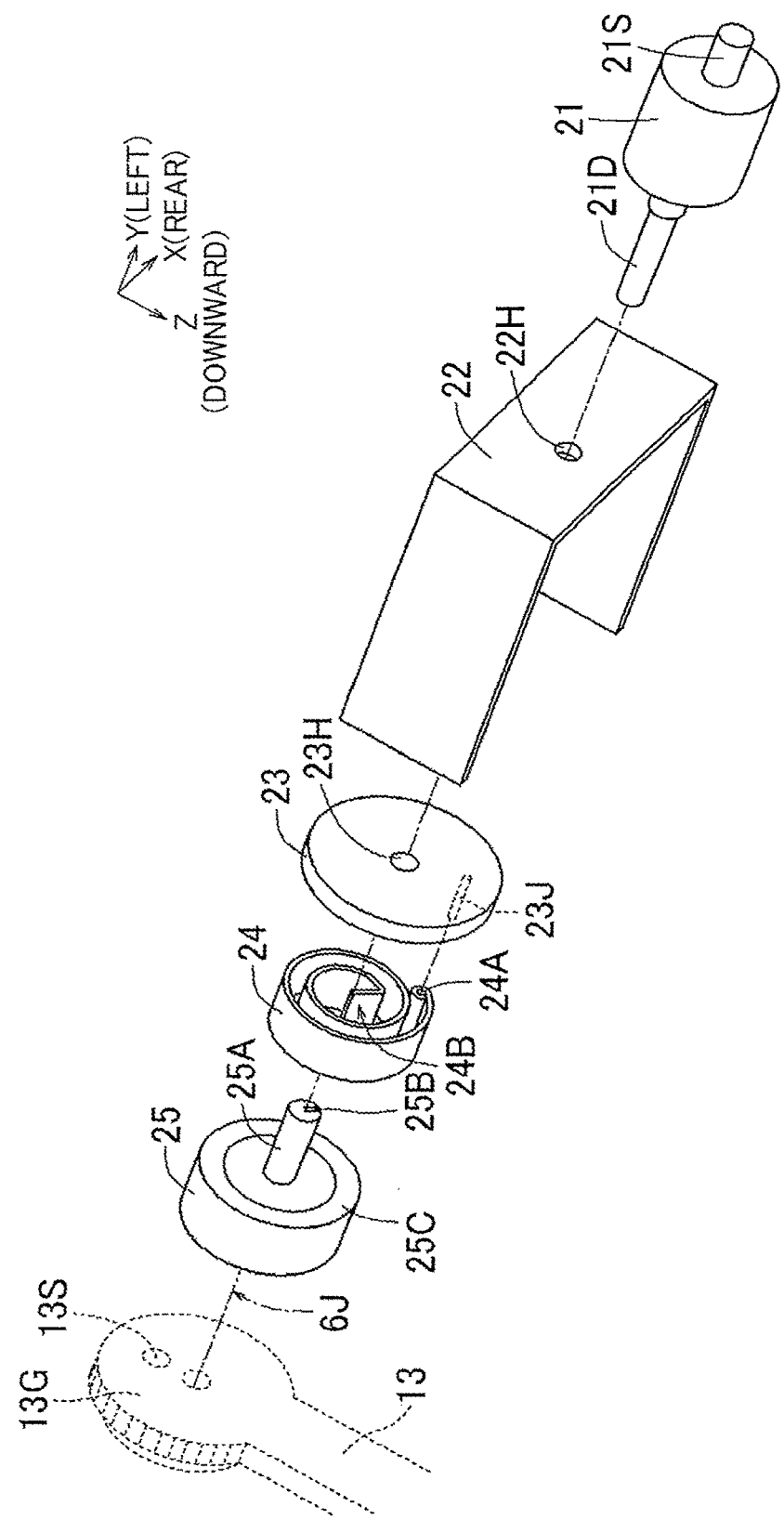
FIG. 5 is an enlarged view of a part V in FIG. 1 and is an exploded perspective view illustrating configurations of a spiral spring and an apparent spring constant varying portion.
Figure 6:
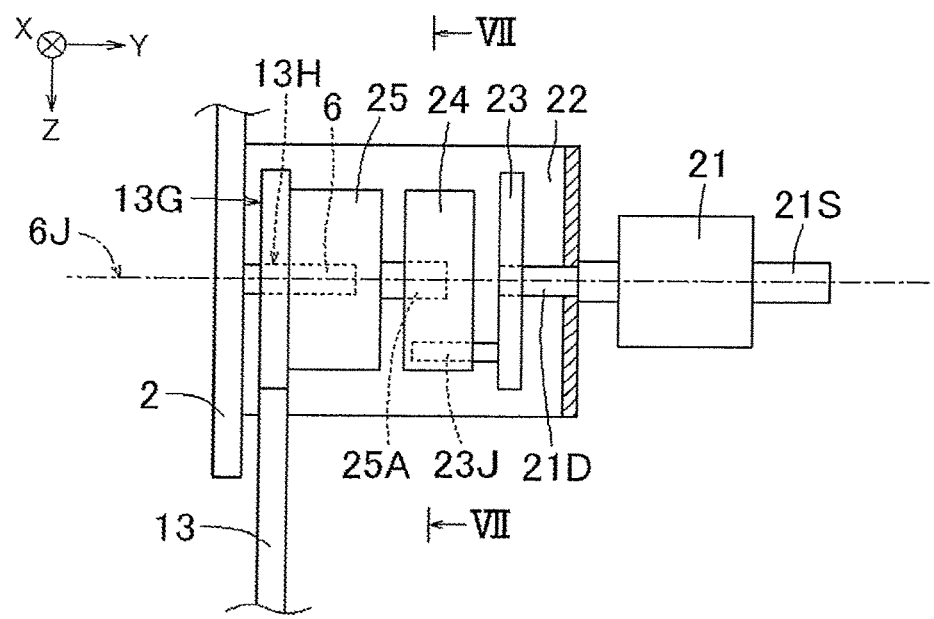
FIG. 6 is a view of FIG. 2 seen in a VI-direction and is a view illustrating disposition of each of members coaxially provided on a drive shaft of a drive shaft member.
Figure 7:
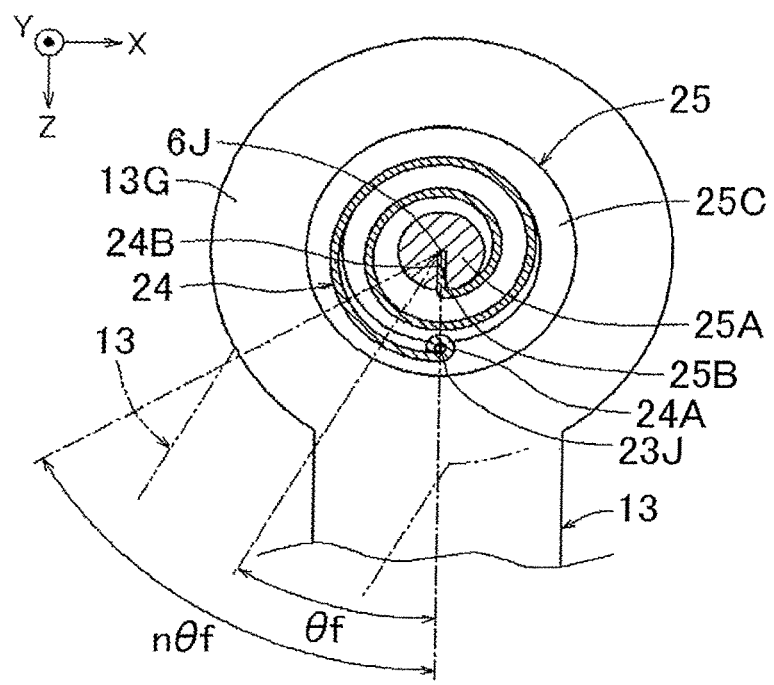
FIG. 7 is a cross-sectional view taken along VII-VII in FIG. 6 and is a view illustrating a state where a changed swinging angle of a transmission output shaft member of a transmission is amplified at a predetermined speed change ratio with respect to a first swinging angle of the femoral swinging arm.

As illustrated in FIG. 5, the input/output portion 25C of the transmission 25 (speed reducer) is fixed to the disk portion 13G of the femoral swinging arm 13. The transmission 25 outputs, as the turning angle of the shaft 25A, an output turning angle nθ obtained by multiplying an input turning angle θ input to the input/output portion 25C by "n" times based on a speed change ratio (n) set in advance. Thus, as illustrated in FIG. 7, the transmission 25 includes the shaft 25A. When the femoral swinging arm 13 swings at the first swinging angle (θf), the shaft 25A swings at a changed swinging angle (nθf) that is changed based on the predetermined speed change ratio (n). In addition, as illustrated in FIG. 5, the shaft 25A is provided with a spring free end insertion groove 25B which is a groove for fixing a free end 24B of the spiral spring 24 and extends in a direction of the drive axis 6J. In the transmission 25, when the shaft 25A is turned by an angle θ due to urging torque from the spiral spring 24, the femoral swinging arm 13 is turned by the turning angle θ×(1/n).

The spiral spring 24 is formed by spirally winding an elastic body, such as a spring member, around a predetermined axis. As illustrated in FIG. 5, one end, which is an end portion positioned in the vicinity of the center portion of the winding, is the free end 24B, and the other end, which is an end portion positioned at a position away from the center portion of the winding, is a fixed end 24A. In FIG. 5, the free end 24B is fixed to the spring free end insertion groove 25B of the shaft 25A, and the fixed end 24A is fixed to a spring support 23J of the rigidity adjustment member 23.

The through-hole 23H is formed in the rigidity adjustment member 23 such that the output shaft 21D at the distal portion of the electric motor 21 is inserted therethrough. The rigidity adjustment member 23 is supported by the output shaft 21D and is fixed to the base portion 2 with the bracket 22 and the electric motor 21. In addition, on a surface of the rigidity adjustment member 23 facing the spiral spring 24, there is provided the spring support 23J supporting the fixed end 24A of the spiral spring 24 at a position away from the drive axis 6J. For example, the spring support 23J is a shaft member extending along the direction of the drive axis 6J and is inserted through a tubular portion formed at a position of the fixed end 24A of the spiral spring 24. The rigidity adjustment member 23 is turned around the drive axis 6J by the electric motor 21, and thus, the position of the fixed end 24A of the spiral spring 24 is varied in a circumferential direction. In this manner, the rigidity adjustment member 23 is supported so as to be able to turn around the drive axis 6J. When the rigidity adjustment member 23 is turned around the drive axis 6J by a predetermined turning angle, the position of the spring support 23J with respect to the drive axis 6J is moved in the circumferential direction by a predetermined turning angle around the drive axis 6J.

The output shaft 21D is provided at the distal portion of the electric motor 21. In addition, the output shaft 21D may be provided with a speed reducer. The output shaft 21D is inserted through the through-hole 22H of the bracket 22. The electric motor 21 is fixed to the bracket 22, and the bracket 22 is fixed to the base portion 2. In addition, electric power and a drive signal are supplied to the electric motor 21 from a battery and a control portion accommodated in the control unit 5. The electric motor 21 turns the rigidity adjustment member 23 around the drive axis 6J with respect to the bracket 22 (that is, the base portion 2) and can move the position of the fixed end 24A of the spiral spring 24 in the circumferential direction. In addition, the electric motor 21 is provided with a rotation angle detecting portion 21S such as an encoder. The rotation angle detecting portion 21S outputs a signal corresponding to a rotation angle of the shaft of the electric motor 21, to the control portion. The control portion 50 can detect the turning angle of the rigidity adjustment member 23 based on a detection signal from the rotation angle detecting portion 21S. The bracket 22 or the base portion 2 may be provided with an angle detecting portion (angle sensor) which detects the turning angle of the rigidity adjustment member 23 with respect to the bracket 22. In addition, the electric motor 21 is controlled by the control portion 50 (refer to FIG. 12). As described below, the position of the fixed end 24A is changed in real time in accordance with the swinging state of the femoral swinging arm 13.

Figure 8:
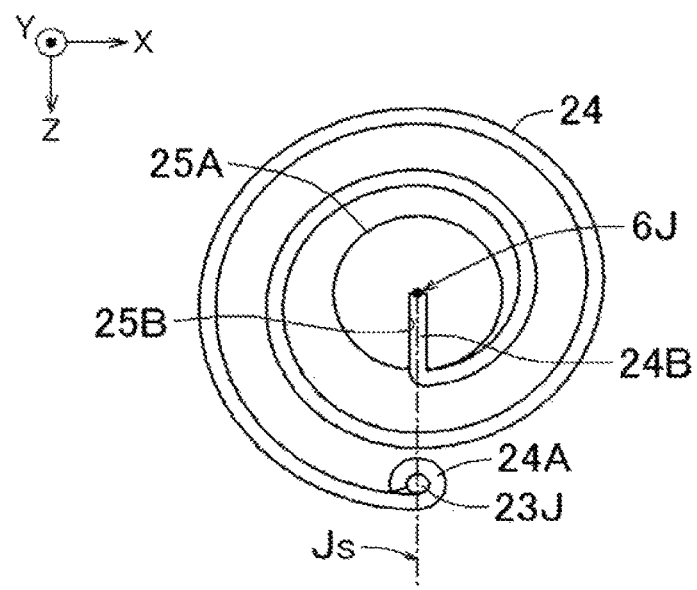
FIG. 8 illustrates a state where no urging torque is generated in the spiral spring in a case where a swinging angle of the femoral swinging arm is zero, FIG. 8 being a perspective view illustrating a reference position of a spring support (that is, spring fixing end) with respect to the drive shaft.

The position of the fixed end 24A of the spiral spring 24 and a rigidity adjustment angle θs will be described with reference to FIGS. 8 to 11. FIG. 8 illustrates an example of a case where a user T illustrated in FIG. 3 is in an upright state and the swinging angle of the femoral swinging arm 13 is zero, that is, an example of a case where the urging torque of the spiral spring 24 is zero. When the fixed end 24A of the spiral spring 24 is at the position illustrated in the example of FIG. 8, urging torque around the drive axis 6J in the clockwise direction and urging torque around the drive axis 6J in the "counter"-clockwise direction are not generated in the free end 24B. A reference line Js illustrated in FIG. 8 is a virtual straight line passing through the drive axis 6J and the spring free end insertion groove 25B in a case where the position of the fixed end 24A is adjusted (in a case where the turning angle of the rigidity adjustment member 23 is adjusted) such that the urging torque is not generated in the free end 24B when the swinging angle of the femoral swinging arm 13 is zero. The reference line Js indicates a reference turning angle position of the shaft 25A. In addition, the position of the fixed end 24A (spring support 23J) illustrated in the example of FIG. 8 is a reference position of the fixed end 24A of the spiral spring 24 (spring support 23J). In order to facilitate understanding of the description, in the example of FIG. 8, the reference line Js extends in the vertical direction and the fixed end 24A is on the reference line Js when the swinging angle of the femoral swinging arm 13 is zero.

Figure 9:
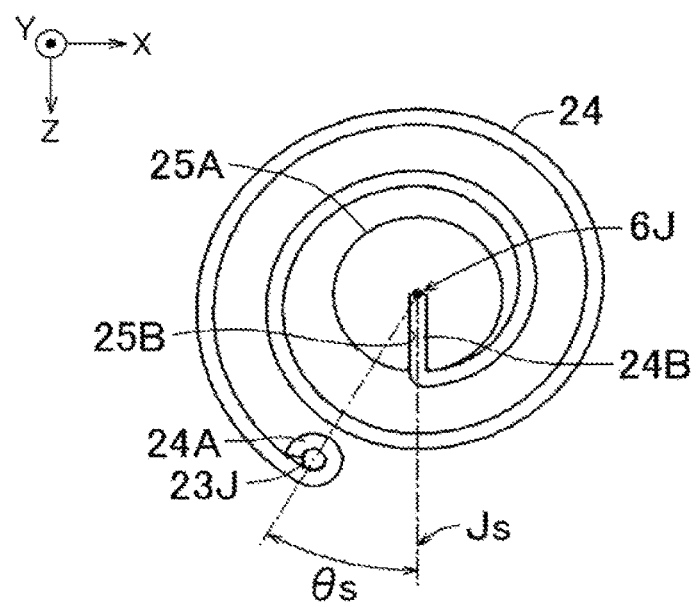
FIG. 9 is a view illustrating a state where a rigidity adjustment member is turned by a predetermined turning angle from the state of FIG. 8 and a position of the spring support with respect to the drive shaft is moved from the reference position.

In addition, FIG. 9 illustrates a state where the electric motor 21 is driven from the state illustrated in FIG. 8 to change the position of the fixed end 24A of the spiral spring 24 to a position moved from the reference position in the circumferential direction by the rotation angle (θs) in the clockwise direction. This state is referred to as "state where the rigidity adjustment angle θs is given to the spiral spring 24 in the clockwise direction". In this state, even when the user T is in the upright state and the swinging angle of the femoral swinging arm 13 is zero, the urging torque of the spiral spring 24 acts on the shaft 25A due to the rigidity adjustment angle θs in the clockwise direction and the urging torque acts on the femoral swinging arm 13 from the shaft 25A via the transmission 25.

Figure 10:
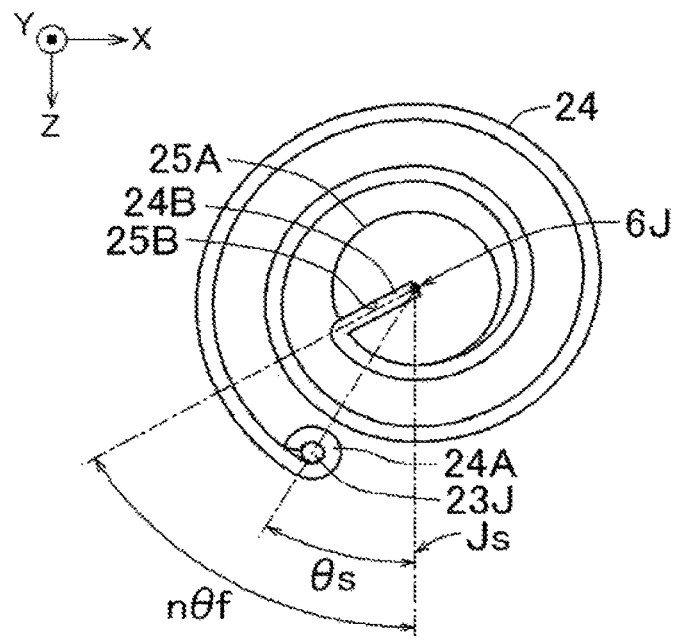
FIG. 10 is a view illustrating an area including a free end and a fixed end of the spiral spring in a case where the femoral swinging arm has swung forward from the state of FIG. 9.

In addition, FIG. 10 illustrates an example of a case where the femoral swinging arm 13 is swung in the clockwise direction by the first swinging angle θf in a state where "the rigidity adjustment angle θs in the clockwise direction" illustrated in FIG. 9 is given. In a case where the speed change ratio of the transmission 25 is "n", when the femoral swinging arm 13 swings by the first swinging angle θf in the clockwise direction, the shaft 25A of the transmission 25 swings by the swinging angle nθf in the clockwise direction. That is, in the example illustrated in FIG. 10, in the spiral spring 24, urging torque in the "counter"-clockwise direction, which corresponds to an angle (nθf−θs) obtained by subtracting the rigidity adjustment angle θs from the swinging angle nθf, is generated.

Figure 11:
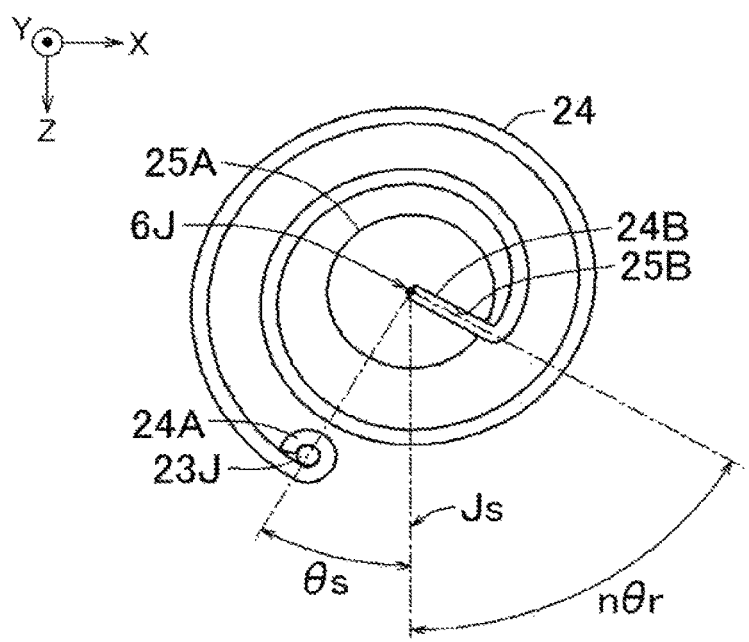
FIG. 11 is a view illustrating the area including the free end and the fixed end of the spiral spring in a case where the femoral swinging arm has swung rearward from the state of FIG. 9.

FIG. 11 illustrates an example of a case where the femoral swinging arm 13 is swung by a first swinging angle θr in the "counter"-clockwise direction in a state where "the rigidity adjustment angle θs in the clockwise direction" illustrated in FIG. 9 is given. In a case where the speed change ratio of the transmission 25 is "n", when the femoral swinging arm 13 swings by the first swinging angle θr in the "counter"-clockwise direction, the shaft 25A of the transmission 25 swings by a swinging angle nθr in the "counter"-clockwise direction. That is, in the example illustrated in FIG. 11, in the spiral spring 24, urging torque in the clockwise direction, which corresponds to an angle (nθr+θs) obtained by adding the swinging angle nθr to the rigidity adjustment angle θs, is generated.

The apparent spring constant varying portion seen from the femoral swinging arm 13 is constituted by the transmission 25 (transmission 25 may be omitted), the spiral spring 24, the rigidity adjustment member 23, and the electric motor 21 (rigidity adjustment electric motor) described above. The apparent spring constant varying portion varies the rigidity around the drive axis 6J. As described above, "rigidity" indicates the torque per unit angle displacement required to swing the femoral swinging arm 13, and an apparent spring constant of the spiral spring 24 seen from the femoral swinging arm 13 is related to the torque. Thus, "apparent rigidity of the elastic body (spiral spring) seen from the femoral swinging arm 13" is the "apparent spring constant of the spiral spring 24 seen from the femoral swinging arm 13", and a spring constant is a kind of rigidity. When the rigidity of the elastic body is varied, energy can be optimally stored, and the stored energy can be optimally released. In addition, an "apparent rigidity varying portion which varies the apparent rigidity of the elastic body seen from the femoral swinging arm 13" is the "apparent spring constant varying portion which varies the apparent spring constant of the spiral spring 24 seen from the femoral swinging arm 13".

Subsequently, with reference to FIG. 12, the input/output of the control portion 50 will be described. The control unit 5 accommodates the control portion 50 and the battery 60. In addition, the control unit 5 is provided with an activation switch 54, a touch panel 55 which is an input-output portion, a charging connector 61 for the battery 60, and the like. In addition, the control portion 50 (control device) includes a CPU 50A, a motor driver 52, and the like. There are also provided a program for executing processing in the control portion 50, and a storage device which stores various kinds of measurement results and the like, but illustration thereof will be omitted.

As described below, the control portion 50 determines a target rigidity adjustment angle that is the rotation angle of the rigidity adjustment member 23, at which the apparent spring constant of the spiral spring 24 seen from the femoral swinging arm 13 becomes an optimal value, thereby outputting a drive current ($I_{out}$ in FIG. 12) to the electric motor 21 via the motor driver 52. The electric motor 21 rotates the rigidity adjustment member 23 via the output shaft 21D based on a drive current from the control portion 50. The rotation angle of the shaft of the electric motor 21 is detected by the rotation angle detecting portion 21S, and a detection signal ($\phi_{ref}$ in FIG. 12) is input to the CPU 50A. In addition, an actual drive current from the motor driver 52 is detected by a detection circuit (illustration thereof will be omitted) which is provided inside the motor driver 52, and a detection signal ($I_{ref}$ in FIG. 12) from the detection circuit is input to the CPU 50A. The CPU 50A performs feedback control such that the actual rotation angle of the rigidity adjustment member 23 based on the detection signal ($\phi_{ref}$) from the rotation angle detecting portion 21S and the detection signal ($I_{ref}$) from the motor driver 52 approaches the target rigidity adjustment angle.

A detection signal ($\theta_{ref}$ in FIG. 12) from the first angle detecting portion 13S is input to the control portion 50. The control portion 50 can detect the first swinging angle of the femoral swinging arm 13 with respect to the base portion 2 based on the detection signal from the first angle detecting portion 13S.

The activation switch 54 is a switch configured to activate the control portion 50. In addition, the touch panel 55 is a device configured to input the height, the weight, and the like of the user, and to display a setting state, and the like. In addition, the charging connector 61 is a connector to which a charging cable is connected when the battery 60 is charged.

Figure 13:
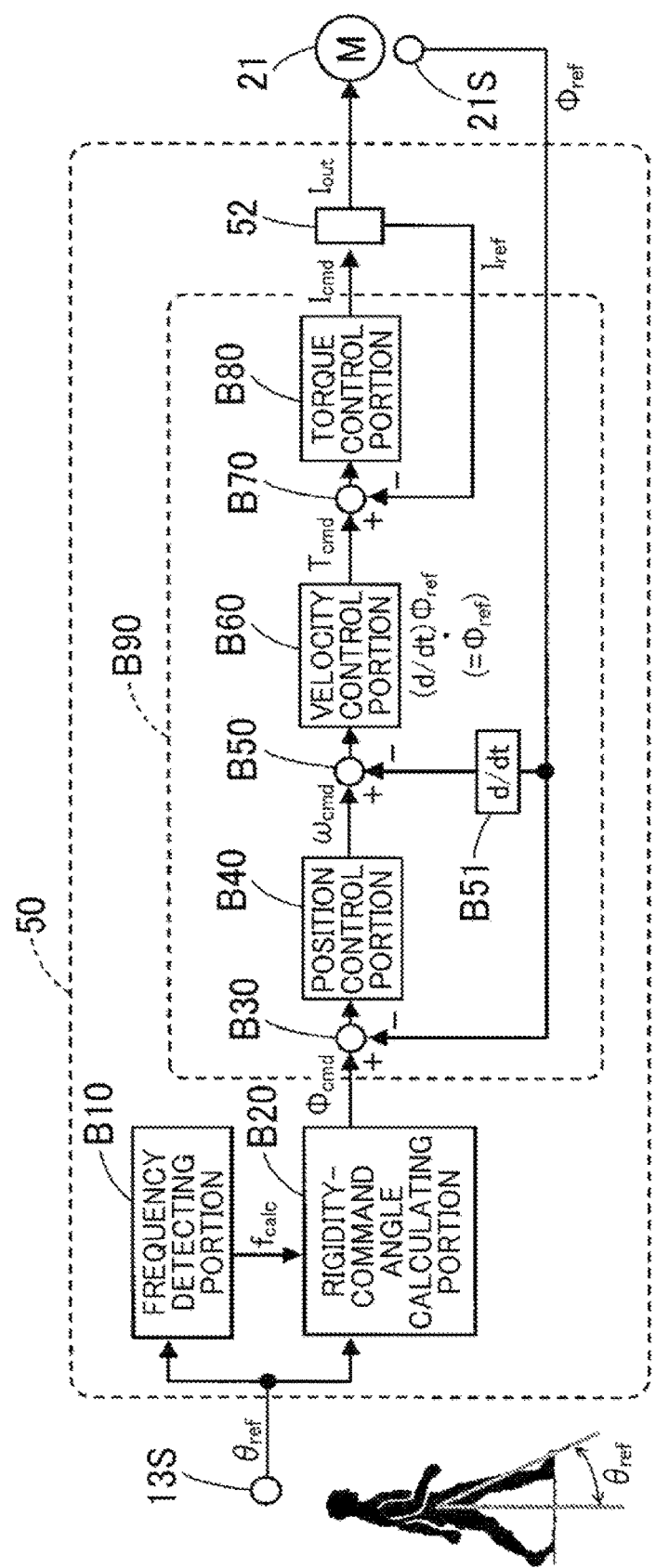
FIG. 13 is a view illustrating a configuration of the control portion.

Subsequently, with reference to FIG. 13, the configuration of the control portion 50 will be described. As illustrated in FIG. 13, the control portion 50 includes a frequency detecting portion B10, a rigidity-command angle calculating portion B20, a first adder B30, a position control portion B40, a second adder B50, a velocity control portion B60, a third adder B70, a torque control portion B80, the motor driver 52 (refer to FIG. 12), a differentiator B51, and the like. The control portion 50 including the frequency detecting portion B10 may be regarded as a frequency detector.

The first swinging angle $\theta_{ref}$ of a swinging reciprocating moving body (in this case, a lower limb of the user), which is the detection signal from the first angle detecting portion 13S, is input to the frequency detecting portion B10. The frequency detecting portion B10 estimates a frequency of a motion waveform (frequency of swinging motion) based on a motion trajectory which indicates a change of the first swinging angle $\theta_{ref}$ over time. Then, the frequency detecting portion B10 outputs an estimated frequency $f_{calc}$, which is a frequency estimated, to the rigidity-command angle calculating portion B20.

The swinging angle $\theta_{ref}$ from the first angle detecting portion 13S and the estimated frequency $f_{calc}$ from the frequency detecting portion B10 are input to the rigidity-command angle calculating portion B20, and the rigidity-command angle calculating portion B20 calculates the apparent spring constant that is appropriate with respect to the estimated frequency $f_{calc}$ of the swinging reciprocating moving body and the first swinging angle $\theta_{ref}$ at the moment. Then, the rigidity-command angle calculating portion B20 calculates a command angle $\phi_{cmd}$ that is a rotation angle of the electric motor 21 required to make the apparent spring constant coincident with the calculated apparent spring constant, and outputs the calculated $\phi_{cmd}$ to the first adder B30.

The command angle $\phi_{cmd}$ from the rigidity-command angle calculating portion B20, and the actual angle $\phi_{ref}$ that is an actual rotation angle of the electric motor 21 based on the detection signal from the rotation angle detecting portion 21S are input to the first adder B30. Then, the first adder B30 outputs a "positional deviation (=command angle $\phi_{cmd}$-actual angle $\phi_{ref}$)" that is a deviation between the command angle $\phi_{cmd}$ and the actual angle $\phi_{ref}$, to the position control portion B40.

The position control portion B40 is a position feedback control portion. The position control portion B40 calculates a command velocity $\omega_{cmd}$ based on the positional deviation input from the first adder B30 by performing so-called PID control, and outputs the calculated command velocity $\omega_{cmd}$ to the second adder B50. Since the PID control of the position control portion B40 is general feedback control, detailed description will be omitted.

The command velocity $\omega_{cmd}$ from the position control portion B40 and an actual angular velocity (d/dt) $\phi_{ref}$, which indicates a change of the actual angle $\phi_{ref}$ from the rotation angle detecting portion 21S over time, are input to the second adder B50. Then, the second adder B50 outputs a "velocity deviation (=command velocity $\omega_{cmd}$-actual angular velocity (d/dt) $\phi_{ref}$" that is a deviation between the command velocity $\omega_{cmd}$ and the actual angular velocity (d/dt) $\phi_{ref}$, to the velocity control portion B60. Since the actual angular velocity (d/dt) $\phi_{ref}$ is indicated in Expression 1-1 as follows, (d/dt) $\phi_{ref}$ may be replaced by the term on the right side in Expression 1-1.

$$(d/dt)\phi_{ref} = \dot{\phi}_{ref} \qquad \text{Expression 1-1}$$

The actual angle $\phi_{ref}$ is input to the differentiator B51, and the differentiator B51 outputs the actual angular velocity (d/dt) $\phi_{ref}$ that is a change of the actual angle $\phi_{ref}$ over time, to the second adder B50.

The velocity control portion B60 is a velocity feedback control portion. The velocity control portion B60 calculates a command torque $T_{cmd}$ based on a velocity deviation input from the second adder B50 by performing the so-called PID control, and outputs the calculated command torque $T_{cmd}$ to the third adder B70. Since the PID control of the velocity control portion B60 is general feedback control as well as the PID control of the position control portion B40, detailed description will be omitted.

The command torque $T_{cmd}$ from the velocity control portion B60 and current information $I_{ref}$ from the motor driver 52 are input to the third adder B70, and the third adder B70 outputs a difference (command torque $T_{cmd}$-current information $T_{ref}$) between the command torque $T_{cmd}$ and the current information $I_{ref}$, to the torque control portion B80.

The torque control portion B80 is a torque feedback control portion. The torque control portion B80 calculates a command current $I_{cmd}$ based on the difference input from the third adder B70 by performing the so-called PID control, and outputs the calculated command current $I_{cmd}$, to the motor driver 52. Since the PID control of the torque control portion B80 is general feedback control as well as the PID control of the position control portion B40 and the PID control of the velocity control portion B60, detailed description will be omitted.

A feedback control portion B90 includes the first adder B30, the position control portion B40, the second adder B50, the differentiator B51, the velocity control portion B60, the third adder B70, and the torque control portion B80.

The command current $I_{cmd}$ from the torque control portion B80 is input to the motor driver 52, and the motor driver 52 outputs the drive current $I_{out}$ corresponding to the input command current $I_{cmd}$, to the electric motor 21. In addition, the motor driver 52 outputs the current information $I_{ref}$ that is information corresponding to the actually output drive current $T_{out}$, to the third adder B70.

The electric motor 21 is rotationally driven by the drive current $I_{out}$ from the motor driver 52. In addition, the rotation angle detecting portion 21S outputs the actual angle $\phi_{ref}$ corresponding to the rotation angle of the electric motor 21, to the first adder B30.

Figure 14:
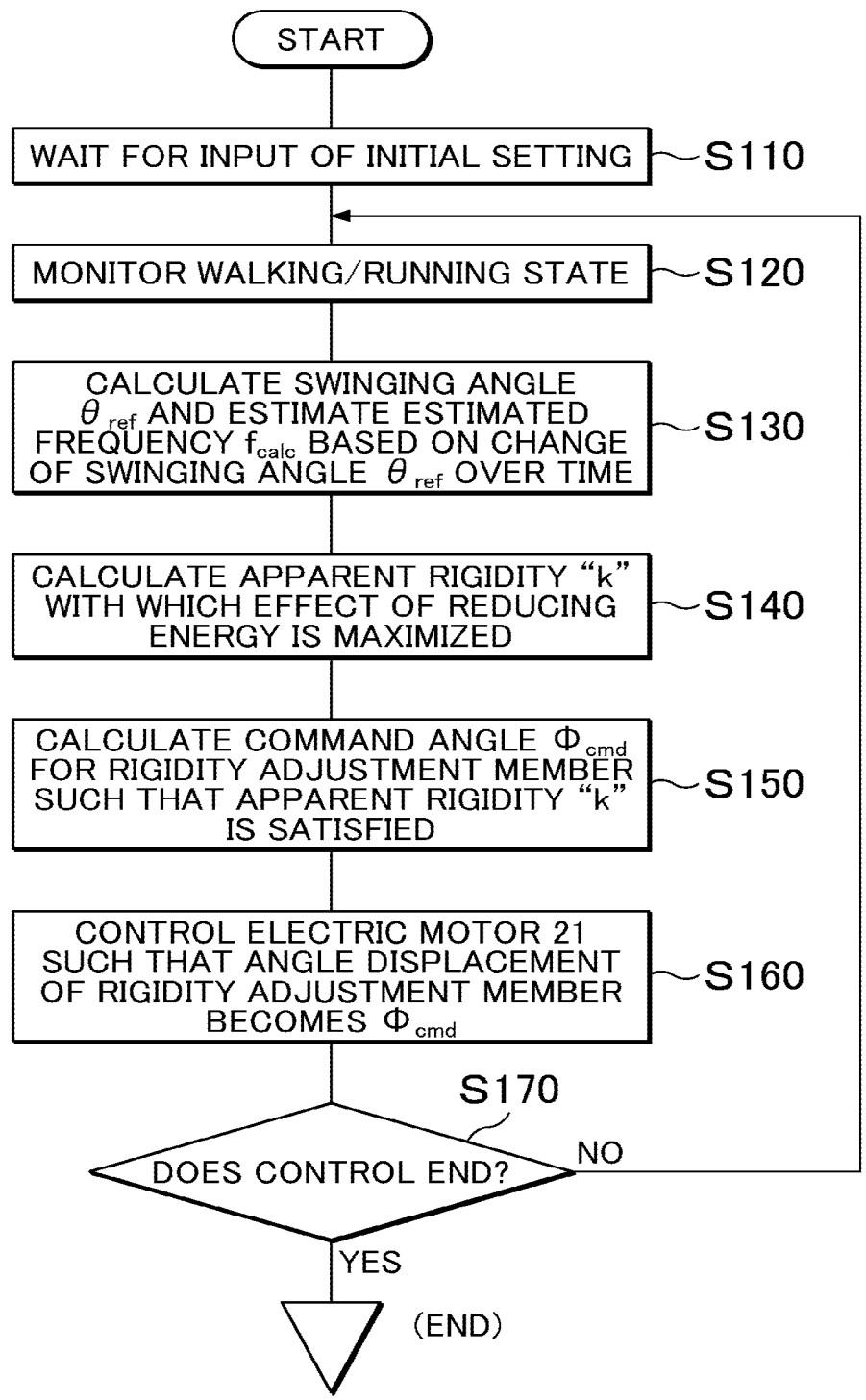
FIG. 14 is a flowchart illustrating an example of a processing procedure of the control portion.

An example of a processing procedure of the control portion 50 based on the configuration of the control portion illustrated in FIG. 13 will be illustrated in a flowchart of FIG. 14. Hereinafter, the processing procedure of the control portion 50 according to the flowchart illustrated in FIG. 14 will be described. When the user operates the activation switch of the control unit, the control portion proceeds to Step S110.

In Step S110, the control portion waits for input of an initial setting from the user via the touch panel. When the control portion determines that the user has input the height and the weight, the control portion proceeds to Step S120. In a case where the control portion does not receive any input from the user even if a predetermined time has elapsed, for example, the control portion sets a standard height and a standard weight set in advance and proceeds to Step S120.

In Step S120, the control portion acquires the detection signal from the first angle detecting portion 13S and measures the walking state (or the running state) of the user, and then, proceeds to Step S130. The detection signal from the first angle detecting portion 13S is constantly acquired to measure the walking state (or the running state) of the user during the control.

In Step S130, the control portion calculates the first swinging angle $\theta_{ref}$ of the femoral swinging arm at that moment based on the detection signal from the first angle detecting portion 13S. Then, the control portion calculates the estimated frequency $f_{calc}$, which is a frequency of reciprocating swinging motion of the swinging reciprocating moving body (in this case, a lower limb of the user), by using a change of the first swinging angle $\theta_{ref}$ over time and the frequency detecting portion B10 illustrated in FIG. 13. Then, the control portion proceeds to Step S140. Step S130 corresponds to the frequency detecting portion B10 illustrated in FIG. 13, and a detailed procedure for determining the estimated frequency $f_{calc}$ with the use of the frequency detecting portion B10 will be described later.

In Step S140, the control portion calculates an apparent spring constant k (apparent rigidity) of the spiral spring 24 with which the effect of reducing energy is maximized, by using the height and the weight of the user input in Step S110, the first swinging angle $\theta_{ref}$ of the femoral swinging arm and the estimated frequency $f_{calc}$ of the swinging motion of the femoral swinging arm, which are calculated in Step S130, and the rigidity-command angle calculating portion B20 illustrated in FIG. 13. Then, the control portion proceeds to Step S150. Step S140 corresponds to the rigidity-command angle calculating portion B20 illustrated in FIG. 13, and a detailed procedure for determining the apparent spring constant k (rigidity k) of the spiral spring 24 with the use of the rigidity-command angle calculating portion B20 will be described later.

In Step S150, the control portion calculates the command angle $\phi_{cmd}$ (rotation angle of the rigidity adjustment member 23) for the electric motor 21, by using the apparent spring constant k of the spiral spring 24 determined in Step S140, and the rigidity-command angle calculating portion B20 illustrated in FIG. 13. Then, the control portion proceeds to Step S160. Step S150 corresponds to the rigidity-command angle calculating portion B20 illustrated in FIG. 13, and a detailed procedure for determining the command angle $\phi_{cmd}$ for the electric motor 21 with the use of the rigidity-command angle calculating portion B20 will be described later.

In Step S160, the control portion controls the electric motor 21 by using the feedback control portion B90 illustrated in FIG. 13 such that the rotation angle of the electric motor 21 coincides with the command angle $\phi_{cmd}$, and then, the control portion proceeds to Step S170. Step S160 corresponds to the feedback control portion B90 illustrated in FIG. 13. Since the operation of the feedback control portion B90 is the same as the operation of general feedback control, description will be omitted.

In Step S170, the control portion monitors the walking state (or the running state) and determines whether the user desires to stop the assistance for the walking motion (or the running motion). In a case where the control portion determines that the user desires to stop the assistance (Yes), the control portion ends the control. In a case where the control portion determines that the user does not desire to stop the assistance (No), the control portion returns to Step S120.

Figure 15:
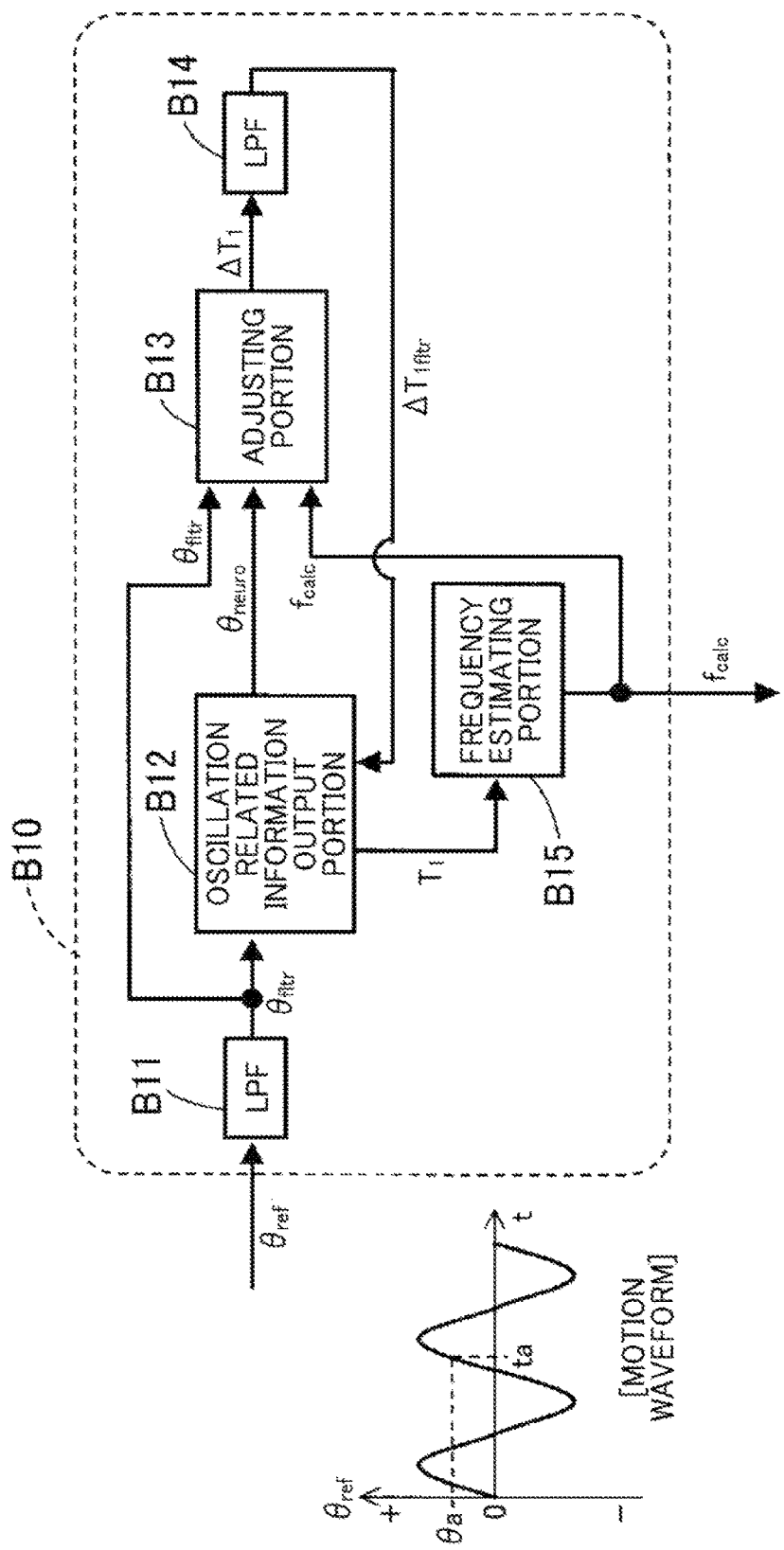
FIG. 15 is a view illustrating a configuration of a frequency detecting portion in FIG. 13.

Subsequently, with reference to FIGS. 15 to 18, the processing in Step S130 will be described in detail. Step S130 corresponds to the frequency detecting portion B10 illustrated in FIG. 13. Hereinafter, the configuration of the frequency detecting portion B10 and the calculation procedure for the estimated frequency $f_{calc}$ performed by the frequency detecting portion B10 will be described in detail. FIG. 15 illustrates the configuration of the frequency detecting portion B10. The frequency detecting portion B10 includes a first filter B11, an oscillation related information output portion B12, an adjusting portion B13, a second filter B14, a frequency estimating portion B15, and the like.

Hereinafter, description will be provided using the following definitions. Moving body position related information is information related to a position of a reciprocating moving body (in this case, a lower limb of the user) varied with a lapse of time. Estimated moving body position related information is information related to the position of the reciprocating moving body varied with the lapse of time, the estimated moving body position related information being estimated based on an oscillation waveform that is in synchronization with the moving body position related information. $\theta_{ref}$ is a first swinging angle (corresponding to the moving body position related information) (rad) based on the detection signal from the first angle detecting portion. $\theta_{ftr}$ is a filter-passed angle (corresponding to the moving body position related information) (rad) obtained by passing the first swinging angle $\theta_{ref}$ through the first filter B11. $\theta_{neuro}$ is a neural oscillator output angle (corresponding to the estimated moving body position related information) (rad) determined by the oscillation related information output portion B12 based on the filter-passed angle $\theta_{ftr}$. $T_1$ is a frequency adjustment parameter determined by the oscillation related information output portion B12 based on the filter-passed angle $\theta_{ftr}$. $\Delta T_1$ is a neural oscillator correction parameter (corresponding to a correction parameter) determined by the adjusting portion B13 based on the filter-passed angle $\theta_{ftr}$, the neural oscillator output angle $\theta_{neuro}$, and the estimated frequency $f_{calc}$. $\Delta T_{ftr}$ is a filter-passed correction parameter obtained by passing the neural oscillator correction parameter $\Delta T_1$ through the second filter B14. $f_{calc}$ is an estimated frequency (Hz) determined by the frequency estimating portion B15 based on the frequency adjustment parameter $T_1$.

The first filter B11 is a so-called low-pass filter. The first swinging angle $\theta_{ref}$ which is the moving body position related information, is input to the first filter B11, and the first filter B11 outputs the filter-passed angle $\theta_{ftr}$ that is the moving body position related information, to the oscillation related information output portion B12 and the adjusting portion B13. For example, in the example of FIG. 15, based on the "motion waveform" of the reciprocating moving body, the angle $\theta a$ is input to the first filter B11 as the first swinging angle $\theta_{ref}$ at a time point ta. The first filter B11 removes a noise component superimposed on the first swinging angle $\theta_{ref}$, thereby contributing to improvement of the accuracy of the estimated frequency $f_{calc}$. The first filter B11 may be omitted.

The moving body position related information (in this case, the filter-passed angle $\theta_{ftr}$) related to the position of the reciprocating moving body (in this case, a lower limb of the user) varied with the lapse of time is input to the oscillation related information output portion B12. The oscillation related information output portion B12 includes a mathematical model including a neural oscillator which performs oscillation in synchronization with reciprocating motion (in this case, reciprocating swinging motion) of the reciprocating moving body, based on the input filter-passed angle $\theta_{ftr}$. The oscillation related information output portion B12 determines the neural oscillator output angle $\theta_{neuro}$ and the frequency adjustment parameter $T_1$ as oscillation related information that is information related to the oscillation waveform based on the oscillation of the neural oscillator in synchronization with the reciprocating motion of the reciprocating moving body. The oscillation related information output portion B12 outputs the determined neural oscillator output angle $\theta_{neuro}$ to the adjusting portion B13 and outputs the determined frequency adjustment parameter $T_1$ to the frequency estimating portion B15. A detail ed procedure in which the oscillation related information output portion B12 determines the neural oscillator output angle $\theta_{neuro}$ and the frequency adjustment parameter $T_1$ will be described later.

The filter-passed angle $\theta_{fltr}$, the neural oscillator output angle $\theta_{neuro}$, and the estimated frequency $f_{calc}$ are input to the adjusting portion B13, and the adjusting portion B13 determines the neural oscillator correction parameter $\Delta T_1$ (corresponding to the correction parameter). The adjusting portion B13 outputs the determined neural oscillator correction parameter $\Delta T_1$ to the second filter B14. The neural oscillator correction parameter $\Delta T_1$ is a correction amount for adjusting the oscillation related information output portion B12 such that the frequency of the motion waveform of the reciprocating moving body (in this case, a lower limb of the user) and the estimated frequency $f_{calc}$ coincide with each other. A detailed procedure in which the adjusting portion B13 determines the neural oscillator correction parameter $\Delta T_1$ will be described later.

The second filter B14 is a so-called low-pass filter. The neural oscillator correction parameter $\Delta T_1$ is input to the second filter B14, and the second filter B14 outputs the filter-passed correction parameter $\Delta T_{1fltr}$ to the oscillation related information output portion B12. The second filter B14 removes a noise component superimposed on the neural oscillator correction parameter $\Delta T_1$, thereby contributing to improvement of the accuracy of the estimated frequency $f_{calc}$. The second filter B14 may be omitted.

The frequency adjustment parameter $T_1$ is input to the frequency estimating portion B15, and the frequency estimating portion B15 determines the estimated frequency $f_{calc}$ based on the input frequency adjustment parameter $T_1$. The frequency estimating portion B15 outputs the determined estimated frequency $f_{calc}$ the adjusting portion B13 and the rigidity-command angle calculating portion B20 (refer to FIG. 13). A detailed procedure in which the frequency estimating portion B15 determines the estimated frequency $f_{calc}$ will be described later.

The procedure in which the neural oscillator output angle $\theta_{neuro}$ and the frequency adjustment parameter $T_1$ are determined by the oscillation related information output portion B12 will be described with reference to FIGS. 16 to 18. The oscillation related information output portion B12 uses the model illustrated in the example of FIG. 16 in which two neurons mutually suppress the stimuli, as the mathematical model including the neural oscillator. The oscillation related information output portion B12 oscillates (performs oscillation) in synchronization with the reciprocating motion of the reciprocating moving body (in this case, a lower limb of the user) based on the input filter-passed angle $\theta_{fltr}$.

Hereinafter, description will be provided using the following definitions. $x_1$ is a membrane potential of a neuron and is a state variable for $f(x_1)$. $x_2$ is a membrane potential of a neuron and is a state variable for $f(x_2)$. $f(x_1)$ and $f(x_2)$ are outputs of the neurons on condition that $f(x_j)=\max(0, x_j)$. $v_1$ is a variable indicating the degree of adaptation and is a state variable for $f(v_1)$. $v_2$ is a variable indicating the degree of adaptation and is a state variable for $f(v_2)$. $f(v_1)$ and $f(v_2)$ are variables indicating the degree of adaptation on condition that $f(v_j)=\max(0, v_j)$. $\beta$ is a constant determining the change in adaptation over time and is adaptation strength. $\gamma$ is a constant determining the change in adaptation over time and is a coupling coefficient for two adaptive elements. $u_0$ is an external input that is a uniform constant. $T_1$ is a frequency adjustment parameter. $T_2$ is a parameter to be adjusted and is a time constant. b is a parameter to be adjusted and is an input coefficient. c is a parameter to be adjusted and is an output coefficient. $\theta_{fltr}$ is a filter-passed angle (moving body position related information) (rad). $\theta_{neuro}$ is a neural oscillator output angle (estimated moving body position related information) (rad).

Figure 16:
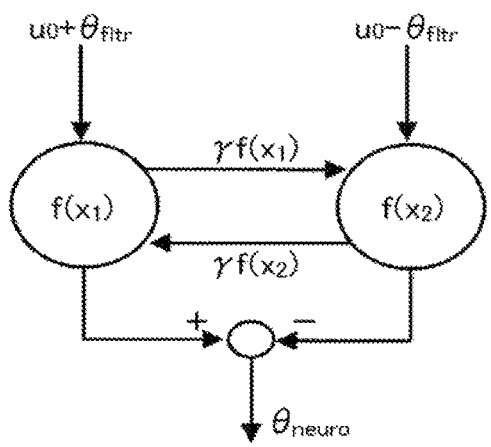
FIG. 16 is a view illustrating a concept of an oscillation related information output portion in FIG. 15.

In a case where the above-described definitions are used, the mathematical model illustrated in FIG. 16 is a mathematical model including the neural oscillator having the relationships Expression 1 to Expression 5 described below. The mathematical model is a mathematical model described in various kinds of literatures, and the mathematical model is utilized in the disclosure.

$$T_1\dot{x}_1+x_1=-\gamma f(x_2)+b(u_0+\theta_{fltr})-\beta f(v_1) \quad \text{Expression 1}$$

$$T_2\dot{v}_1+v_1=f(x_1) \quad \text{Expression 2}$$

$$T_1\dot{x}_2+x_2=-\gamma f(x_1)+b(u_0-\theta_{fltr})-\beta f(v_2) \quad \text{Expression 3}$$

$$T_2\dot{v}_2+v_2=f(x_2) \quad \text{Expression 4}$$

$$\theta_{neuro}=cf(x_1)-cf(x_2) \quad \text{Expression 5}$$

Figure 17:
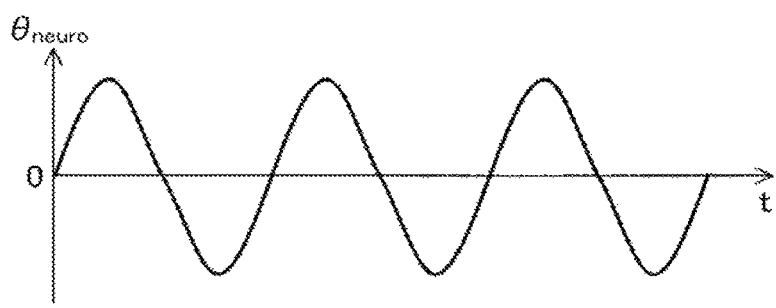
FIG. 17 is a view illustrating an example of estimated moving body position related information ($\theta_{neuro}$) output from the oscillation related information output portion.
Figure 18:
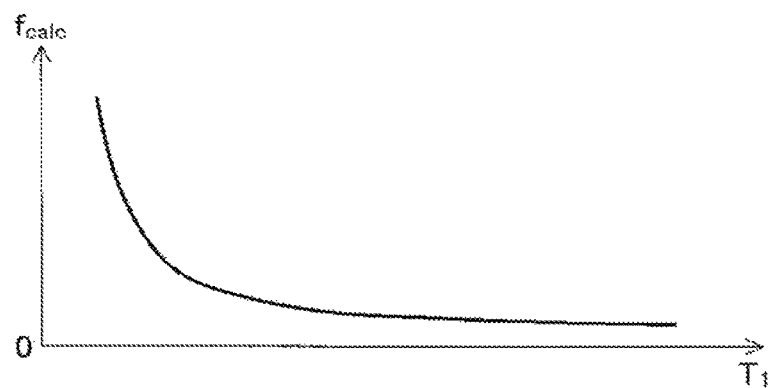
FIG. 18 is a view illustrating a relationship between a frequency adjustment parameter ($T_1$) output from the oscillation related information output portion, and an estimated frequency ($f_{calc}$) output from a frequency estimating portion.

In the above-described Expression 1 and Expression 3, when a value is input to the filter-passed angle $\theta_{fltr}$, the oscillation waveform is output as illustrated in FIG. 17. The oscillation waveform is an oscillation waveform caused due to an oscillation that is in synchronization with the reciprocating motion (in this case, the reciprocating swinging motion) of the reciprocating moving body (in this case, a lower limb of the user). When the oscillation waveform of FIG. 17 is output, the neural oscillator output angle $\theta_{neuro}$ at a time point t is determined and the frequency adjustment parameter $T_1$ is determined. It has been found that, in a case where the value of the frequency adjustment parameter $T_1$ and the value of the parameter $T_2$ are changed without changing the ratio ($T_1/T_2$) between the frequency adjustment parameter $T_1$ and the parameter $T_2$, the relationship between the frequency adjustment parameter $T_1$ and the estimated frequency $f_{calc}$ is an inverse proportional relationship as illustrated in the example of FIG. 18.

A procedure in which the neural oscillator correction parameter $\Delta T_1$ is determined by the adjusting portion B13 will be described. In a technique in the related art in which the frequency adjustment parameter $T_1$ is adjusted to vary an output waveform, in order to utilize the characteristics illustrated in FIG. 18, the following definitions are used and the neural oscillator correction parameter $\Delta T_1$ is adjusted through the following Expression 6. $K_p$ is a parameter adjustment gain that is a constant. sgn(x) is a signum function which becomes 1 when x>0, becomes 0 when x=0, and becomes 1 when x<0. $\theta_{fltr}$ is a filter-passed angle (moving body position related information) (rad). $\theta_{neuro}$ is a neural oscillator output angle (estimated moving body position related information) (rad). $\Delta T_1$ is a neural oscillator correction parameter (correction parameter).

$$\Delta T_1=K_p \text{sgn}(\theta_{neuro})[\text{sgn}(\dot{\theta}_{fltr})-\text{sgn}(\dot{\theta}_{neuro})] \quad \text{Expression 6}$$

However, the inventors of the disclosure have found that there are problems in the above-described Expression 6 as described below in (a) to (c). (a) The expression is an adjustment method focused on only a phase difference, and a frequency is not directly considered in the expression. The phases are caused to coincide with each other without directly correcting the frequency so that the frequencies are indirectly caused to coincide with each other. (b) Since all of the terms are the signum functions (each of the values is any one of 1, 0, and −1), the change of the parameter becomes discrete and the convergence deteriorates. (c) According to FIG. 18, in a case where the estimated frequency $f_{calc}$ is relatively low, since the amount of change of the frequency adjustment parameter $T_1$ is large, a convergence time increases. In addition, in a case where the estimated frequency $f_{calc}$ is relatively high, since the estimated frequency $f_{calc}$ is greatly influenced by the change of the frequency adjustment parameter $T_1$, the output stability deteriorates.

Therefore, in order to solve the aforementioned problems described in (a) to (c), the inventors of the disclosure have created the following Expression 7 by improving the above-described Expression 6 and using the following definitions. In the disclosure, the neural oscillator correction parameter $\Delta T_1$ is determined through the Expression 7, and thus, the convergence of the estimated frequency $f_{calc}$ is improved, and the output stability is improved. $K_{p1}$ and $K_{p2}$ are parameter adjustment gains that are constants. $\text{sgn}(x)$ is a signum function which becomes 1 when x>0, becomes 0 when x=0, and becomes −1 when x<0. $\theta_{fltr}$ is a filter-passed angle (moving body position related information) (rad). $\theta_{neuro}$ is a neural oscillator output angle (estimated moving body position related information) (rad). $f_{calc}$ is an estimated frequency (Hz). $\Delta T_1$ is a neural oscillator correction parameter (correction parameter).

$$\Delta T_1 = (K_{p1}/f_{calc})\{\text{sgn}(\theta_{neuro})[(\dot{\theta}_{fltr})-(\dot{\theta}_{neuro})]\}-(K_{p2}/f_{calc})(|\theta_{fltr}|-|\theta_{neuro}|) \qquad \text{Expression 7}$$

The above-described expression is regarded as Expression 7. In this Expression 7, the part solving the aforementioned problem in (a) corresponds to $(|\theta_{fltr}|-|\theta_{neuro}|)$ in the second line (second term) in Expression 7. In addition, the part solving the aforementioned problem in (b) corresponds to $[(\theta_{fltr})-(\theta_{neuro})]$ in the first line (first term) in Expression 7. In addition, the part solving the aforementioned problem in (c) corresponds to $1/f_{calc}$ in the first line and $1/f_{calc}$ in the second line.

In addition, as the adjustment of the amplitude of the output waveform (oscillation waveform illustrated in FIG. 17), the parameter c and the parameter b in Expression 1 to Expression 5 are adjusted by utilizing the following Expression 8 and Expression 9. The constant "0.6" in Expression 9 is an empirical value and the constant is not limited to this numerical value.

$$\Delta c = |\theta_{fltr}| - |\theta_{neuro}| \qquad \text{Expression 8}$$

$$\Delta b = 0.6 - (|\theta_{neuro}|/c) \qquad \text{Expression 9}$$

A procedure in which the estimated frequency $f_{calc}$ is determined by the frequency estimating portion B15 will be described. The inventors of the disclosure have created the following Expression 10 to determine the estimated frequency $f_{calc}$ by using the following definitions. $c_1$ and $c_2$ are constants of a frequency estimation calibration expression. The factor $T_1$ is a frequency adjustment parameter. $f_{calc}$ is an estimated frequency (Hz). In a case where the ratio of $T_1/T_2$ is uniform, the following expression is established.

$$f_{calc} = (c_1/T_1) + c_2 \qquad \text{Expression 10}$$

As described above, the first swinging angle $\theta_{ref}$ is input to the frequency detecting portion B10 illustrated in FIGS. 13 and 15, and the frequency detecting portion B10 outputs the estimated frequency $f_{calc}$. In the disclosure, the frequency of the motion waveform of the reciprocating moving body is determined by determining the estimated frequency $f_{calc}$. The determined frequency is used ($\omega$ is applied on condition that $\omega = 2\pi f_{calc}$) in the calculations of the apparent spring constant and the rotation angle of the rigidity adjustment member described below, and thus, the control accuracy is further improved and a greater effect of reducing energy can be obtained. This calculation of the frequency is not performed in JP 2012-66375 A and JP 2013-236741 A. In addition, for example, the operation of the frequency detecting portion B10 described above is less likely to be influenced by noise in a case where the user slightly stumbles during walking and the frequency is momentarily deviated. Thus, the stable estimated frequency $f_{calc}$ can be obtained. Hereinafter, description will be provided on detailed processing of the rigidity-command angle calculating portion B20 illustrated in FIG. 13. The estimated frequency $f_{calc}$ and the first swinging angle $\theta_{ref}$ are input to the rigidity-command angle calculating portion B20, and the rigidity-command angle calculating portion B20 outputs the command angle $\phi_{cmd}$.

Figure 19:
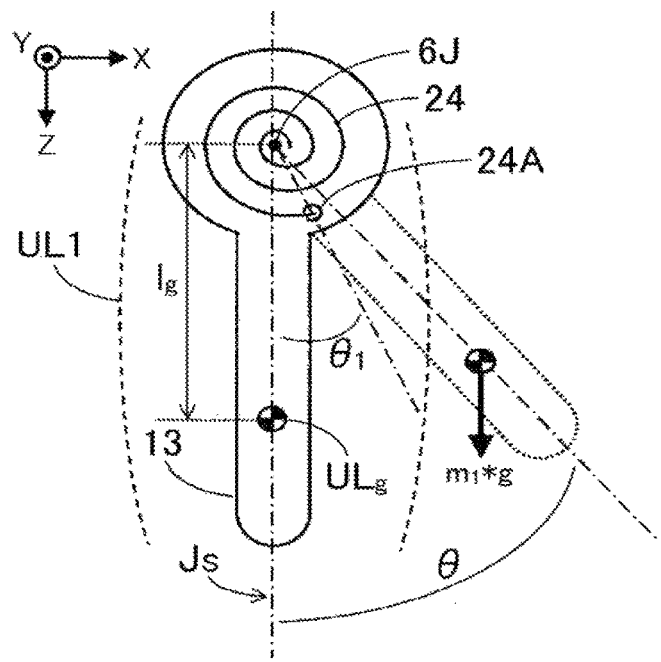
FIG. 19 is a schematic view for illustrating an operation of a rigidity-command angle calculating portion in FIG. 13.

The details of the processing (calculation procedure for the apparent rigidity (spring constant) k and the command angle $\phi_{cmd}$ performed by the rigidity-command angle calculating portion B20) in Steps S140 and S150 will be described with reference to FIGS. 19 and 20. In other words, with reference to FIGS. 19 and 20, detailed description will be provided on the procedure of calculating the apparent rigidity (spring constant) k of the spiral spring seen from the reciprocating moving body in order to reduce energy for the reciprocating motion of the reciprocating moving body (femoral swinging arm 13+femoral attachment portion 19+femoral region UL1+lower leg region UL2 (refer to FIG. 4)) which is a lower limb of the user including the femoral swinging arm 13, by using the swinging joint device 1, and the procedure of calculating the command angle $\phi_{cmd}$ (rotation angle of the rigidity adjustment member 23 (electric motor 21)). In the description below, the influence of gravitational force applied to a lower limb of the user is also considered.

Hereinafter, description will be provided using the following definitions. For example, the following $I_g$, $J_1$, and $m_1$ are estimated by the control portion 50 based on the height, the weight, and the like input by the user. In addition, $c_3$, $k_1$, n, and η are set in the control portion 50 in advance. τ is drive torque (Nm) around the drive axis 6J illustrated in FIG. 19. $\tau_1$ is motor torque (Nm) of the electric motor 21. $J_1$ is moment of inertia (kgm$^2$) of the reciprocating moving body. $c_3$ is a viscosity coefficient (Nms/rad) of the reciprocating moving body. k is apparent rigidity (spring constant) (Nm/rad) of the spiral spring 24 seen from the reciprocating moving body. $k_1$ is an original spring constant (Nm/rad) of the spiral spring 24. $m_1$ is mass (mass of a lower limb of the user+femoral swinging arm 13+femoral attachment portion 19) (kg) of the reciprocating moving body. g is gravitational acceleration (m/s$^2$). $l_g$ is a distance (m) from the drive axis 6J which is the swinging center to the gravity center $UL_g$ of the reciprocating moving body. θ is a swinging angle (displacement angle of the femoral swinging arm 13) (rad) of the reciprocating moving body. |θ| is amplitude (rad) of the displacement angle of the reciprocating moving body. θ' is a torsional amount (rad) of the spiral spring 24. $\theta_1$ is the rotation angle of the electric motor 21 (rotation angle of the rigidity adjustment member 23) (rad). ω is an angular frequency (rad/s) of the reciprocating moving body. t is a time (s). n is a reduction ratio of the transmission 25. η is efficiency of the transmission 25.

In the definitions described above, swinging angle θ of reciprocating moving body=first swinging angle $θ_{ref}$ (Expression 11) is established, rotation angle $θ_1$ of electric motor 21=command angle $φ_{cmd}$ (Expression 12) is established, and angular frequency ω of reciprocating moving body=$2πf_{calc}$ (Expression 13) is established.

The equation of motion for the reciprocating moving body can be expressed by the following Expression 14. When the fifth-order Taylor expansion is applied to Expression 14, the following Expression 15 can be acquired.

$$τ = J_1\ddot{θ} + c_3\dot{θ} + kθ + m_1 g l_g \sin θ \quad \text{Expression 14}$$

$$τ = J_1\ddot{θ} + c_3\dot{θ} + kθ + m_1 g l_g \left(θ - \frac{θ^3}{3!} + \frac{θ^5}{5!}\right) \quad \text{Expression 15}$$

Here, with the use of Expression 16, the following Expression 17 can be acquired.

$$\dot{θ} = \frac{a}{d}\sin ωt,\ d = c_3 \quad \text{Expression 16}$$

$$τ = \left(J_1 ω - \frac{1}{ω}\left(k + m_1 g l_g\left(1 - \frac{\left(-\frac{a}{c_3 ω}\cos ωt\right)^2}{3!} + \frac{\left(-\frac{a}{c_3 ω}\cos ωt\right)^4}{5!}\right)\right)\right)\frac{a}{c_3}\cos ωt + a\sin ωt \quad \text{Expression 17}$$

In addition, the displacement angle θ of the femoral swinging arm 13 and the amplitude |θ| of the displacement angle of the reciprocating moving body can be expressed by the following Expression 18 and Expression 19. In addition, Expression 20 can be acquired from Expression 16 and Expression 19.

$$θ = \int \dot{θ}\,dt = -\frac{a}{c_3 ω}\cos ωt \quad \text{Expression 18}$$

$$|θ| = a/(dω) \quad \text{Expression 19}$$

$$a = |θ| c_3 ω \quad \text{Expression 20}$$

In addition, the following Expression 21 can be acquired by substituting Expression 20 into Expression 17.

$$τ = \left(J_1 ω - \frac{1}{ω}\left(k + m_1 g l_g\left(1 - \frac{(-|θ|\cos ωt)^2}{3!} + \frac{(-|θ|\cos ωt)^4}{5!}\right)\right)\right)|θ|ω\cos ωt + c_3|θ|ω\sin ωt$$

$$= A|θ|ω\cos ωt + B|θ|ω\sin ωt \quad \text{Expression 21}$$

In this case, torque amplitude can be expressed by the following Expression 22. In this Expression 22, in order to minimize |τ|, A=0 should be satisfied in Expression 22. When the apparent rigidity at the moment is k, the following Expression 23 is established. The following Expression 24 can be acquired from Expression 23.

$$|τ| = \sqrt{A^2|θ|^2 ω^2 + B^2|θ|^2 ω^2} \quad \text{Expression 22}$$

$$J_1 ω - \frac{1}{ω}\left(k + m_1 g l_g\left(1 - \frac{(-|θ|\cos ωt)^2}{3!} + \frac{(-|θ|\cos ωt)^4}{5!}\right)\right) = 0 \quad \text{Expression 23}$$

$$k = J_1 ω^2 - m_1 g l_g\left(1 - \frac{(-|θ|\cos ωt)^2}{3!} + \frac{(-|θ|\cos ωt)^4}{5!}\right) \quad \text{Expression 24}$$

Here, when the forces are assumed to be balanced with each other, τ in a case where the spiral spring is seen from the reciprocating moving body-side can be expressed by Expression 25. In addition, τ in a case where the reciprocating moving body is seen from the spiral spring-side can be expressed by Expression 26.

$$τ = kθ \quad \text{Expression 25}$$

$$τ = ηnτ_1 \quad \text{Expression 26}$$

The torque $τ_1$ generated in the input shaft of the speed reducer can be expressed by the following Expression 27. When it is considered that the fixed end of the spiral spring is rotated by $θ_1$ by rotating the electric motor 21, the following Expression 28 can be acquired. In addition, the following Expression 29 can be acquired by substituting Expression 28 into Expression 27.

$$τ_1 = k_1 θ' \quad \text{Expression 27}$$

$$θ' = nθ - θ_1 \quad \text{Expression 28}$$

$$τ_1 = k_1(nθ - θ_1) \quad \text{Expression 29}$$

The following Expression 30 can be acquired by substituting Expression 29 into Expression 26. The following Expression 31 can be acquired with the use of Expression 30 and Expression 25, and Expression 32 can be acquired by modifying Expression 31.

$$τ = ηnk_1(nθ - θ_1) = ηn^2 k_1[1 - θ_1/(nθ)]θ \quad \text{Expression 30}$$

$$k = ηn^2 k_1[1 - θ_1/(nθ)] \quad \text{Expression 31}$$

$$θ_1 = nθ[1 - k/(ηn^2 k_1)] \quad \text{Expression 32}$$

Thus, in Step S140 in the flowchart illustrated in FIG. 14, the apparent rigidity k is calculated based on the above-described Expression 24. In Step S150, based on the calculated k and the above-described Expression 32, the rotation angle $θ_1$ of the electric motor 21 is calculated. Thus, it is possible to reduce a load (energy for walking or running) of the user by adjusting the rotation angle $θ_1$ of the position of the fixed end 24A of the spiral spring 24 in real time such that the apparent rigidity k is satisfied with respect to the first swinging angle θ of the femoral swinging arm 13 changing every moment. As expressed in the above-described Expression 11 to Expression 13, swinging angle θ of reciprocating moving body=first swinging angle $θ_{ref}$ is established, rotation angle $θ_1$ of electric motor 21=command angle $φ_{cmd}$ is established, and angular frequency ω of reciprocating moving body=$2πf_{calc}$ is established.

Figure 20:
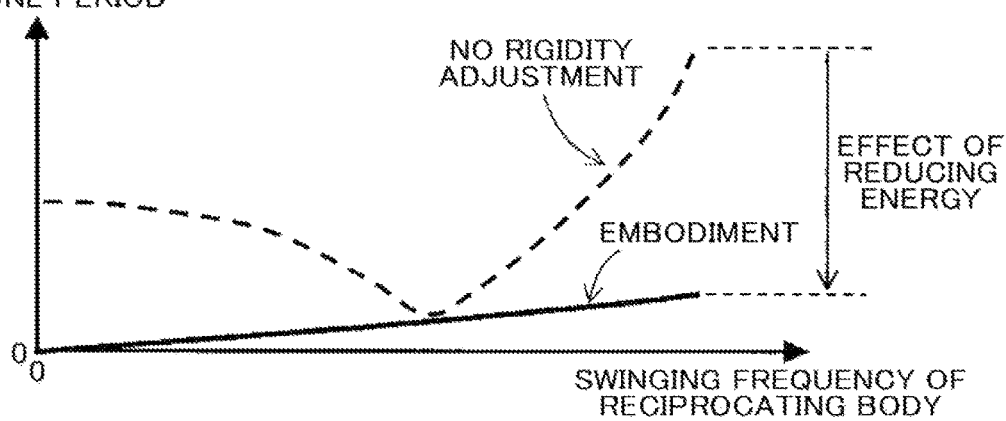
FIG. 20 is a view illustrating an example of an effect of reducing energy by adjusting apparent rigidity of the swinging joint device.

FIG. 20 illustrates an example of the characteristics in a case where the rigidity adjustment is not performed and in a case where the rigidity adjustment described in the embodiment is performed. In FIG. 20, the horizontal axis indicates a swinging frequency of the reciprocating moving body and the vertical axis indicates consumption energy (i.e., consumed energy) when the reciprocating moving body is driven for one period. By performing the rigidity adjustment according to the embodiment (adjustment in consideration of the influence of gravitational force), it is possible to obtain the effect of reducing energy in accordance with the swinging frequency of the reciprocating moving body.

Figure 21:
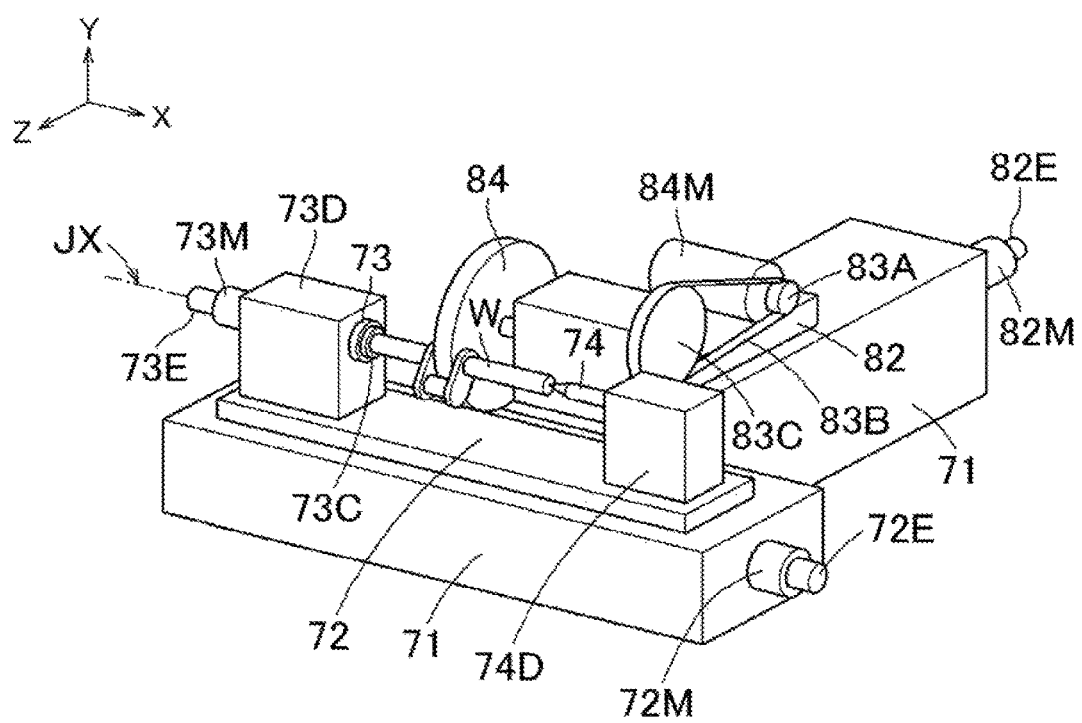
FIG. 21 is a perspective view of a machine tool for illustrating an example of reciprocating linear motion.

An example of a case where the reciprocating moving body performs reciprocating linear motion will be described with reference to FIGS. 21 and 22. In the above description, the example, in which the reciprocating moving body is a lower limb of the user performing reciprocating swinging motion, is described. However, even in a case where the reciprocating moving body performs reciprocating linear motion, the disclosure can be applied. For example, a machine tool illustrated in FIG. 21 is a machine tool including a bed 71, a main shaft table 72, a grinding head 82, and the like, and the swinging joint device can be applied to the machine tool. In FIG. 21, the X-axis, the Y-axis, and the Z-axis are orthogonal to each other. A rotation axis JX of a workpiece W is parallel to the X-axis. The main shaft table 72 can reciprocate in the X-axis direction with respect to the bed 71. The grinding head 82 can reciprocate in the Z-axis direction orthogonal to the rotation axis JX of the workpiece W, with respect to the bed 71.

The bed 71 is provided with an electric motor 72M including an encoder 72E (which is an angle detecting portion and can also be used as a position detecting portion). The electric motor 72M causes the main shaft table 72 to reciprocate along the X-axis direction with respect to the bed 71 based on a drive current from a motor control device (not illustrated). The motor control device detects the position of the main shaft table 72 in the X-axis direction based on a detection signal from the encoder 72E. When the main shaft table 72 moves in the X-axis direction, the relative position of a grinding stone 84 with respect to the workpiece W in the X-axis direction changes.

The main shaft table 72 is provided with a headstock 73D including a main shaft 73, a chuck 73C, and an electric motor 73M; and a tailstock 74D including a center 74. The crank-shaped workpiece W is held by the chuck 73C and the center 74 and is rotated around the workpiece rotation axis JX parallel to the X-axis by the main shaft 73. The electric motor 73M rotates the main shaft 73 around the workpiece rotation axis JX based on a drive current from the motor control device (not illustrated). The motor control device detects the rotation angle of the main shaft 73 based on a detection signal from an encoder 73E. In addition, the center 74 is urged in a direction of the main shaft 73.

The bed 71 is provided with an electric motor 82M including an encoder 82E (which is an angle detecting portion and can also be used as a position detecting portion). The electric motor 82M causes the grinding head 82 to reciprocate along the Z-axis direction with respect to the bed 71 based on a drive current from the motor control device (not illustrated). The motor control device detects the position of the grinding head 82 in the Z-axis direction based on a detection signal from the encoder 82E. When the grinding head 82 moves in the Z-axis direction, the relative position of the grinding stone 84 with respect to the workpiece W in the Z-axis direction changes.

The grinding head 82 is provided with an electric motor 84M to which a drive pulley 83A is connected, and the grinding stone 84 to which a driven pulley 83C is connected. The rotational power of the drive pulley 83A is transferred to the driven pulley 83C through a transfer belt 83B, thereby rotationally driving the grinding stone 84. The electric motor 84M rotates the grinding stone 84 based on a drive current from the motor control device (not illustrated).

In a case of grinding a crankpin while rotating the crank-shaped workpiece W, it is necessary to cause the grinding head 82 to perform reciprocating linear motion in the Z-axis direction in accordance with the rotation angle of the workpiece W, by using the electric motor 82M. Therefore, as illustrated in FIG. 22, a swinging joint device 101 is connected to the grinding head 82. FIG. 22 is a schematic view of a state in which the swinging joint device 101 is connected to the grinding head 82 when seen in the Y-axis direction. The bed 71, the main shaft table 72, and the like are omitted. In the swinging joint device 101, the femoral swinging arm 13 is changed to an arm 113 (that may be regarded as the first output portion) having a long hole 113A, as compared to the above-described swinging joint device 1. In addition, a protruding portion 82A is connected to the grinding head 82, and the protruding portion 82A is provided with a connection portion 82B. The connection portion 82B is inserted through the long hole 113A of the arm 113. In addition, the base portion 2 of the swinging joint device 101 is fixed to the bed or the like.

Figure 22:
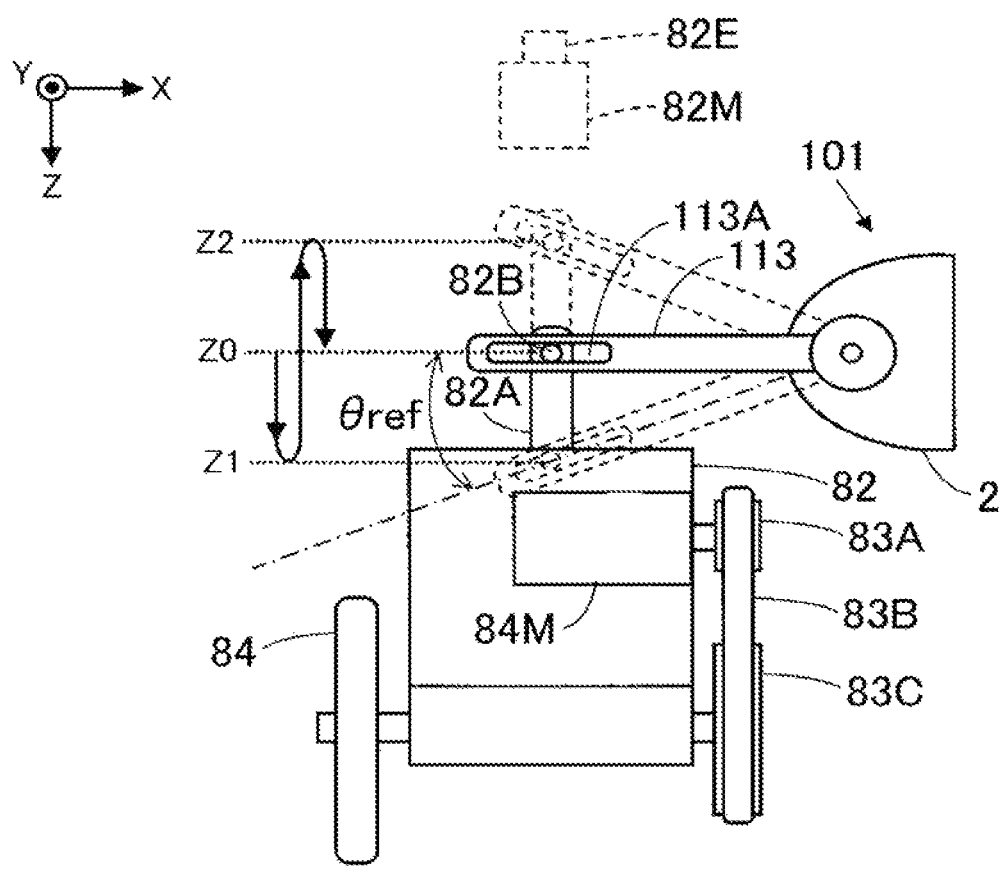
FIG. 22 is a view illustrating an example in which the swinging joint device is installed in a grinding stone table performing reciprocating linear motion.

In FIG. 22, the electric motor 82M causes the grinding head 82 to perform reciprocating linear motion in the Z-axis direction in accordance with the rotation angle of the main shaft 73 (that is, the rotation angle of the workpiece W). During the reciprocating linear motion, the grinding head 82 reciprocates between a position Z1 and a position Z2 with a position Z0 serving as the center. In this case, as illustrated in FIG. 22, the first swinging angle $\theta_{ref}$ of the arm 113 is varied with a lapse of time. As illustrated in FIG. 22, the first swinging angle $\theta_{ref}$ is an angle of the grinding head 82 (reciprocating moving body) based on the position of the grinding head 82 varied with the lapse of time.

In Step S130 illustrated in FIG. 14, the estimated frequency $f_{calc}$ (frequency of the reciprocating linear motion) is estimated with the use of the first swinging angle $\theta_{ref}$, through the above-described procedure. In Steps S140 and S150 illustrated in FIG. 14, the apparent rigidity k and the command angle $\phi_{cmd}$ (rotation angle $\theta_1$ of the electric motor 82M) are calculated through the above-described procedure. Since the grinding head 82 performs reciprocating linear motion in the horizontal direction and is not influenced by the gravitational force, $m_1 g l_g = 0$ is established (that is, $k = J_1 \omega^2$ is established) through Expression 24 which is an expression for the apparent rigidity k. Then, with the use of the command angle $\phi_{cmd}$, in Step S160 illustrated in FIG. 14, the electric motor 21 is controlled such that the rotation angle of the electric motor 21 coincides with the command angle $\phi_{cmd}$. As described above, it is possible to reduce consumption energy (power consumption) of the electric motor 82M by adjusting the apparent rigidity of the swinging joint device 101.

As described above, in the swinging joint device described in the embodiment, the frequency detector (for the reciprocating moving body) constituted by the control portion 50 (refer to FIG. 13) including the frequency detecting portion B10 can appropriately detect the frequency of the motion waveform based on the motion trajectory of the reciprocating moving body which performs reciprocating motion including periodic reciprocating linear motion or periodic reciprocating swinging motion.

In addition, each of the swinging joint devices 1, 101 including the frequency detector is connected to the reciprocating moving body performing the periodic reciprocating swinging motion or to the reciprocating moving body performing the periodic reciprocating linear motion. Each of the swinging joint devices 1, 101 alternately repeats the energy accumulation mode in which energy is accumulated in the elastic body through motion of the reciprocating moving body, and the energy release mode in which the energy accumulated in the elastic body is released so as to assist the motion of the reciprocating moving body. In the swinging joint devices 1, 101, the apparent rigidity seen from the reciprocating moving body is varied such that energy accumulated and released is further increased. Thus, it is possible to further reduce energy for causing the reciprocating moving body to reciprocate.

In the description of the embodiment, the swinging joint device is described. However, the frequency detector (for the reciprocating moving body) to which the first swinging angle $\theta_{ref}$ (moving body position related information) is input and which outputs the estimated frequency $f_{calc}$ may be constituted by the control portion 50 (control unit 5) including the frequency detecting portion B10.

Various modifications, additions, and deletions may be made to the structure, the configuration, the shape, the appearance, the processing procedure, the arithmetic expression, and the like of each of the frequency detector (for the reciprocating moving body) and the swinging joint device according to the disclosure without departing from the scope of the disclosure.

The frequency detector (for the reciprocating moving body) described in the embodiment is not limited to detecting the frequency of reciprocating motion of a lower limb of a user or detecting the frequency of reciprocating motion of a reciprocating moving body of a machine tool. The frequency detector (for the reciprocating moving body) can be applied to detecting the frequency of reciprocating motion of various kinds of reciprocating bodies performing periodic reciprocating linear motion or periodic reciprocating swinging motion.

The usage of the swinging joint device described in the embodiment is not limited to assisting the reciprocating motion (walking or running) of a lower limb of a user, or assisting a reciprocating moving body of a machine tool. The swinging joint device can be applied to various kinds of objects such as various instruments and devices performing periodic reciprocating motion with the use of an electric motor or the like.

In addition, in the embodiment, the transmission 25 is provided between the femoral swinging arm 13 and the spiral spring 24, and the spiral spring 24 is indirectly connected to the femoral swinging arm 13. However, the transmission 25 may be omitted, and the femoral swinging arm 13 and the spiral spring 24 may be directly connected to each other.

In addition, in the embodiment, description is provided on the example in which the spiral spring 24 is used as the elastic body. However, various kinds of elastic bodies can be used instead of the spiral spring 24. For example, another elastic body, such as a spirally-wound extensible spring, a leaf spring, or a wave spring, may be used. In addition, an elastic body utilizing an elastomer such as rubber or a resin, liquid such as oil, or gas may be used. The elastic body can be changed in accordance with the amount of motion of an object (operation) whose energy is to be stored, or the amount of energy to be stored. In a case where the amount of energy to be stored is relatively small, it is effective to use an elastomer. With regard to motion such as walking or running of a user, it is effective to use the spiral spring in view of the relatively large energy storage amount thereof, the magnitude of the spring constant (rigidity) or the like thereof, and easiness in adjustment thereof. In addition, the spiral spring is advantageous in terms of cost as well.

The swinging joint device described above is used for the left leg of the user. However, a base portion (symmetric to the base portion 2) for a right leg, femoral swinging portions (symmetric to the members indicated by the reference numerals 13, 19, and the like) for the right leg, and rigidity adjusting portions (symmetric to the members indicated by the reference numerals 21, 22, 23, 24, 25, and the like) for the right leg may be added such that the control unit 5 assists the walking motion (or the running motion) of both legs of the user.

According to the embodiment, during walking or running of the user, the apparent rigidity varying portion is controlled in consideration of gravitational force from a time when the frequency of the periodic swinging motion is low at a low speed after the user starts walking or running to a time when the frequency of the periodic swinging motion is high at a high speed after the speed of walking or running is increased. Accordingly, it is possible to perform optimal control on the frequency of the swinging motion (frequency of the moving body). When the frequency of the swinging motion is low, the influence of the gravitational force is large. However, it is possible to perform the control taking the influence of gravity into consideration. Thus, it is possible to obtain the effect of reducing energy efficiently.

What is claimed is:

1. A frequency detector for a reciprocating moving body having a rigidity adjustment electric motor, the frequency detector being configured to detect a frequency of a motion waveform based on a motion trajectory of the reciprocating moving body that performs reciprocating motion, the frequency detector comprising:

an oscillation related information output portion to which moving body position related information is input, and which performs oscillation in synchronization with the reciprocating motion of the reciprocating moving body based on the input moving body position related information, and outputs oscillation related information that is information related to an oscillation waveform based on the oscillation, the moving body position related information being related to a position of the reciprocating moving body varied with a lapse of time;

a frequency estimating portion that outputs an estimated frequency of the motion waveform, the estimated frequency being a frequency of the oscillation waveform estimated based on the oscillation related information; and an adjusting portion that determines a correction parameter for the oscillation related information output portion so as to cause the frequency of the motion waveform and the estimated frequency to coincide with each other, wherein the oscillation related information output portion outputs i) a frequency adjustment parameter that is one of pieces of the oscillation related information and is a parameter adjusted based on the correction parameter from the adjusting portion, and ii) estimated moving body position related information that is one of the pieces of the oscillation related information and is estimated as the position of the reciprocating moving body based on the moving body position related information, the frequency estimating portion outputs the estimated frequency determined based on the frequency adjustment parameter that is output from the oscillation related information output portion, the adjusting portion determines a correction parameter for correcting an operation of the oscillation related information output portion, based on the moving body position related information, the estimated moving body position related information, and the estimated frequency, and the adjusting portion adjusts the estimated frequency output from the frequency estimating portion by outputting the determined correction parameter to the oscillation related information output portion to adjust the frequency adjustment parameter and the estimated moving body position related information that are output from the oscillation related information output portion, whereby a rotation angle of the electric motor is controlled based on the adjusted estimated frequency output.

2. The frequency detector for the reciprocating moving body according to claim 1, wherein:

the moving body position related information is input to the oscillation related information output portion and the adjusting portion after the moving body position related information passes through a first filter; and the correction parameter is input to the oscillation related information output portion after the correction parameter passes through a second filter.

3. The frequency detector for the reciprocating moving body according to claim 1, wherein the reciprocating motion is a periodic reciprocating swinging motion, and the moving body position related information is a swinging angle related to the position of the reciprocating moving body varied with the lapse of time.

4. The frequency detector for the reciprocating moving body according to claim 1, wherein in a case where $x_1$ is membrane potential of a neuron and is a state variable for $f(x_1)$, $x_2$ is membrane potential of a neuron and is a state variable for $f(x_2)$, $f(x_1)$ and $f(x_2)$ are outputs of the neurons on condition that $f(x_j)=\max(0, x_j)$, $v_1$ is a variable indicating a degree of adaptation and is a state variable for $f(v_1)$, $v_2$ is a variable indicating a degree of adaptation and is a state variable for $f(v_2)$, $f(v_1)$ and $f(v_2)$ are variables respectively indicating degrees of adaptation on condition that $f(v_j)=\max(0, v_j)$, $\beta$ is a constant determining a change in adaptation over time and is adaptation strength, $\gamma$ is a constant determining a change in adaptation over time and is a coupling coefficient for two adaptive elements, $u_0$ is an external input that is a uniform constant, $T_1$ is the frequency adjustment parameter, $T_2$ is a parameter to be adjusted and is a time constant, $b$ is a parameter to be adjusted and is an input coefficient, $c$ is a parameter to be adjusted and is an output coefficient, $\theta_{fltr}$ is the moving body position related information, and $\theta_{neuro}$ is the estimated moving body position related information, the oscillation related information output portion performs the oscillation based on the input moving body position related information and outputs the frequency adjustment parameter and the estimated moving body position related information that are adjusted based on the correction parameter from the adjusting portion, by using a mathematical model including a neural oscillation having relationships of $$T_1\dot{x}_1+x_1=\gamma f(x_2)+b(u_0+\theta_{fltr})-\beta f(v_1)$$

$$T_2\dot{v}_1+v_1=f(x_1)$$

$$T_1\dot{x}_2+x_2=-\gamma f(x_1)+b(u_0-\theta_{fltr})-\beta f(v_2)$$

$$T_2\dot{v}_2+v_2=f(x_2)$$

$$\theta_{neuro}=cf(x_1)-cf(x_2);$$

in a case where $c_1$ and $c_2$ are constants of a frequency estimation calibration expression, $f_{calc}$ is the estimated frequency, and a ratio of $T_1/T_2$ is uniform, the frequency estimating portion outputs the estimated frequency determined based on a relationship of $f_{calc}=(c_1/T_1)+c_2$ and the frequency adjustment parameter output from the oscillation related information output portion; and in a case where $K_{p1}$ and $K_{p2}$ are parameter adjustment gains that are constants, $sgn(x)$ is a signum function that becomes 1 when $x>0$, becomes 0 when $x=0$, and becomes $-1$ when $x<0$, and $\Delta T_1$ is the correction parameter, the adjusting portion determines the correction parameter based on a relationship of $$\Delta T_1=(K_{p1}/f_{calc})\{sgn(\theta_{neuro})[(\dot{\theta}_{fltr})-(\dot{\theta}_{neuro})]\}-(K_{p2}/f_{calc})(|\theta_{fltr}|-|\theta_{neuro}|),$$

the moving body position related information, the estimated moving body position related information, and the estimated frequency, and the adjusting portion adjusts the estimated frequency output from the frequency estimating portion by outputting the determined correction parameter to the oscillation related information output portion to adjust the frequency adjustment parameter and the estimated moving body position related information that are output from the oscillation related information output portion.

5. A swinging joint device that includes a frequency detector for a reciprocating moving body, the frequency detector being configured to detect a frequency of a motion waveform based on a motion trajectory of the reciprocating moving body that performs reciprocating motion, the frequency detector comprising:

an oscillation related information output portion to which moving body position related information is input, and which performs oscillation in synchronization with the reciprocating motion of the reciprocating moving body based on the input moving body position related information, and outputs oscillation related information that is information related to an oscillation waveform based on the oscillation, the moving body position related information being related to a position of the reciprocating moving body varied with a lapse of time;

a frequency estimating portion that outputs an estimated frequency of the motion waveform, the estimated frequency being a frequency of the oscillation waveform estimated based on the oscillation related information; and an adjusting portion that determines a correction parameter for the oscillation related information output portion so as to cause the frequency of the motion waveform and the estimated frequency to coincide with each other, wherein the oscillation related information output portion outputs i) a frequency adjustment parameter that is one of pieces of the oscillation related information and is a parameter adjusted based on the correction parameter from the adjusting portion, and ii) estimated moving body position related information that is one of the pieces of the oscillation related information and is estimated as the position of the reciprocating moving body based on the moving body position related information, the frequency estimating portion outputs the estimated frequency determined based on the frequency adjustment parameter that is output from the oscillation related information output portion, the adjusting portion determines a correction parameter for correcting an operation of the oscillation related information output portion, based on the moving body position related information, the estimated moving body position related information, and the estimated frequency, and the adjusting portion adjusts the estimated frequency output from the frequency estimating portion by outputting the determined correction parameter to the oscillation related information output portion to adjust the frequency adjustment parameter and the estimated moving body position related information that are output from the oscillation related information output portion, the swinging joint device being connected to the reciprocating moving body performing the reciprocating motion, and the swinging joint device alternately repeating an energy accumulation mode in which energy is accumulated in an elastic body through motion of the reciprocating moving body and an energy release mode in which the energy accumulated in the elastic body is released to assist the motion of the reciprocating moving body, the swinging joint device comprising:

the frequency detector;

a first output portion that is connected to the reciprocating moving body and swings around a swinging center;

the elastic body that accumulates the energy and releases the energy in accordance with a first swinging angle that is a swinging angle of the first output portion and is the moving body position related information;

an apparent rigidity varying portion that varies apparent rigidity of the elastic body seen from the first output portion;

a first angle detecting portion that detects the first swinging angle; and a control portion that adjust the apparent rigidity of the elastic body seen from the first output portion by controlling the apparent rigidity varying portion in accordance with the first swinging angle detected by the first angle detecting portion, wherein the control portion adjusts the apparent rigidity of the elastic body seen from the first output portion, based on the estimated frequency determined by the frequency detector, and the first swinging angle.

6. The swinging joint device according to claim 5, wherein:

the elastic body is a spiral spring;

one end of the spiral spring is connected to a first output portion-side input/output shaft portion that is turned around a spring central axis that is a central axis of the spiral spring, by an angle corresponding to the first swinging angle of the first output portion;

another end of the spiral spring is connected to a rigidity adjustment member that is turned around the spring central axis by a rigidity adjustment electric motor;

the apparent rigidity of the elastic body is an apparent spring constant of the spiral spring; and the apparent rigidity varying portion is constituted by the rigidity adjustment electric motor and the rigidity adjustment member, and the apparent rigidity varying portion adjusts the apparent spring constant of the spiral spring seen from the first output portion by adjusting a turning angle of the rigidity adjustment member with use of the rigidity adjustment electric motor.

* * * * *